(12) United States Patent
Jiang et al.

(10) Patent No.: US 11,509,860 B2
(45) Date of Patent: Nov. 22, 2022

(54) VIDEO ADAPTATION METHOD, RELATED DEVICE, AND STORAGE MEDIUM

(71) Applicant: HUAWEI TECHNOLOGIES CO., LTD., Shenzhen (CN)

(72) Inventors: Liangliang Jiang, Xi'an (CN); Liangliang Liu, Xi'an (CN); Shengsen Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/245,197

(22) Filed: Apr. 30, 2021

(65) Prior Publication Data
US 2021/0250547 A1 Aug. 12, 2021

Related U.S. Application Data

(63) Continuation of application No. PCT/CN2019/104925, filed on Sep. 9, 2019.

(30) Foreign Application Priority Data

Nov. 2, 2018 (CN) .......................... 201811306037.1

(51) Int. Cl.
*H04N 7/14* (2006.01)
*H04N 7/01* (2006.01)

(52) U.S. Cl.
CPC ........... *H04N 7/141* (2013.01); *H04N 7/0117* (2013.01); *H04N 7/0127* (2013.01)

(58) Field of Classification Search
CPC .... H04N 21/23436; H04N 7/14; H04N 7/141; H04N 21/2662; H04N 21/25825;
(Continued)

(56) References Cited

U.S. PATENT DOCUMENTS

2001/0012051 A1* 8/2001 Hara ................... H04N 21/2662
348/14.02
2011/0164676 A1 7/2011 Ozawa
(Continued)

FOREIGN PATENT DOCUMENTS

| CN | 101646033 A | 2/2010 |
| CN | 101646042 A | 2/2010 |

(Continued)

OTHER PUBLICATIONS

Su Heng et al.,"Survey of Super-resolution Image Reconstruction Methods",Acta Automatica Sinica,vol. 39, No. 8,Aug. 2013,with an English abstract,total 12 pages.
(Continued)

*Primary Examiner* — Melur Ramakrishnaiah
(74) *Attorney, Agent, or Firm* — Rimon PC

(57) ABSTRACT

Embodiments of the present disclosure disclose a video adaptation method, a related device, and a related storage medium. The method in the embodiments of the present disclosure includes: receiving indication information sent by a video receiving device, where the indication information is used to indicate an image super-resolution capability of the video receiving device; and if the indication information indicates that the image super-resolution capability of the video receiving device is enabled, obtaining a video having a target frame rate and a target resolution that correspond to the indication information and sending the video having the target frame rate and the target resolution to the video receiving device.

22 Claims, 17 Drawing Sheets

(58) Field of Classification Search
CPC ............ H04N 21/4788; H04N 7/0117; H04N 21/234381; H04N 21/440263; H04L 65/403; H04L 65/602
USPC .......................................... 348/14.01–14.16
See application file for complete search history.

(56) References Cited

U.S. PATENT DOCUMENTS

| | | | | |
|---|---|---|---|---|
| 2014/0118478 A1* | 5/2014 | Nakazawa | ............ | H04N 7/141 348/14.13 |
| 2015/0381930 A1* | 12/2015 | Quinn | ................... | H04N 7/147 348/14.14 |
| 2018/0109782 A1 | 4/2018 | Duparre et al. | | |
| 2019/0045248 A1 | 2/2019 | Shen et al. | | |
| 2019/0045251 A1 | 2/2019 | Shen et al. | | |

FOREIGN PATENT DOCUMENTS

| | | | |
|---|---|---|---|
| CN | 101662606 | A | 3/2010 |
| CN | 101945278 | A | 1/2011 |
| CN | 102137248 | A | 7/2011 |
| CN | 103491388 | A | 1/2014 |
| CN | 103561279 | A | 2/2014 |
| CN | 104144313 | A | 11/2014 |
| CN | 104702976 | A | 6/2015 |
| CN | 105306963 | A | 2/2016 |
| CN | 105657321 | A | 6/2016 |
| CN | 106791927 | A | 5/2017 |
| CN | 107133919 | A | 9/2017 |
| CN | 107358576 | A | 11/2017 |
| CN | 108495128 | A | 9/2018 |
| EP | 2884743 | A1 | 6/2015 |
| JP | 2009081753 | A | 4/2009 |
| WO | 2015053352 | A1 | 4/2015 |

OTHER PUBLICATIONS

European Search Report; dated Sep. 9, 2021; pp. 1-12.

\* cited by examiner

VIDEO ADAPTATION METHOD, RELATED DEVICE, AND STORAGE MEDIUM

CROSS-REFERENCE TO RELATED APPLICATIONS

This application is a continuation of International Application No. PCT/CN2019/104925, filed on Sep. 9, 2019, which claims priority to Chinese Patent Application No. 201811306037.1, filed on Nov. 2, 2018. The disclosures of the aforementioned applications are hereby incorporated by reference in their entireties.

TECHNICAL FIELD

This application relates to the field of network communications technologies, and in particular, to a video adaptation method, and a related device and storage medium.

BACKGROUND

An image super-resolution technology is to restore a high-resolution image from a low-resolution image. To apply the image super-resolution technology to a real-time video, a video network adaptation technology may be used to implement the image super-resolution technology.

The video network adaptation technology is a technology of adaptively adjusting a forward error correction (FEC) redundancy policy, a video frame rate, and a video resolution based on a change of a network status to ensure video definition and smoothness to a maximum extent under the existing network status.

An image super-resolution capability of a terminal has considerable impact on the balance between the video definition and smoothness. However, in the prior art, the image super-resolution capability of the terminal has not been considered in the video network adaptation technology, and because the image super-resolution capability of the terminal is not considered, definition and smoothness of a video displayed by the terminal is often not well balanced. Consequently, the video definition and smoothness cannot be optimally balanced, and video display quality is adversely affected.

SUMMARY

Embodiments of this application provide a video adaptation method, and a related device, and storage medium, so that a video sending device can send a target video based on an image super-resolution capability of a video receiving device, and the video smoothness and definition of the target video displayed by the video receiving device can be adjusted based on the image super-resolution capability of the video receiving device.

A first aspect of the embodiments of the present disclosure provides a video adaptation method, including the following steps.

Step A: A video sending device receives indication information sent by a video receiving device.

The indication information is used to indicate an image super-resolution capability of the video receiving device. For example, the indication information may be used to indicate whether the video receiving device has the image super-resolution capability. For another example, the indication information may be used to indicate whether the image super-resolution capability of the video receiving device is enabled.

Optionally, the indication information may be a parameter included in a session description protocol (SDP) offer, and the video receiving device may set different values of parameters in the SDP offer to indicate different image super-resolution capabilities of the video receiving device. For example, when a value of a parameter, (e.g., Multiple_flag) included in the SDP offer is 0, it indicates that the video receiving device does not have the image super-resolution capability; or when a value of a parameter (e.g., Multiple_flag) included in the SDP offer is 2, it indicates that the video receiving device supports the image super-resolution capability and a multiplier is 2. For another example, when a value of a parameter, e.g., Open_flag, included in the SDP offer is True, it indicates that the video receiving device has enabled the image super-resolution capability; or when a value of a parameter, e.g., Open_flag, included in the SDP offer is False, it indicates that the video receiving device has disabled the image super-resolution capability.

Step B: The video sending device obtains a video having a target frame rate and a target resolution that correspond to the indication information.

The video sending device determines, based on the indication information, whether the image super-resolution capability of the video receiving device is enabled. When the video sending device determines that the indication information indicates that the image super-resolution capability of the video receiving device is enabled, the video sending device obtains the video (or a video file) having the target frame rate and the target resolution that correspond to the indication information.

Step C: The video sending device sends a target video to the video receiving device.

If the video sending device determines that the video having the determined target frame rate and target resolution is the target video, the video sending device sends the determined target video to the video receiving device, and the video receiving device may display the target video.

In this aspect, the video sending device may adjust, based on the image super-resolution capability of the video receiving device, a frame rate and a resolution of the target video to be sent to the video receiving device, so that the target frame rate and the target resolution of the target video that are obtained after the adjustment match the image super-resolution capability of the video receiving device. The video sending device sends the target video to the video receiving device, and the video receiving device may display the target video whose definition and smoothness are balanced. Therefore, it is ensured that the video receiving device displays the high-definition target video, and the smoothness of displaying the target video is also effectively ensured, thereby effectively improving display quality of the target video.

With reference to the first aspect of the embodiments of the present disclosure, in an optional implementation of the first aspect of the embodiments of the present disclosure, step B may include the following steps.

Step B11: The video sending device obtains an encoding bit rate that is suitable for or matches a network status.

By using a bandwidth detection technology, the video sending device obtains at least one of the following network statuses: a bandwidth, a packet loss, a delay, or jitter. When the video sending device obtains the network status, the video sending device obtains the encoding bit rate that matches the network status.

Specifically, an occasion for the video sending device to obtain the encoding bit rate that matches the network status may be as follows: When initially establishing a communication connection to the video receiving device, the video sending device may obtain the encoding bit rate that matches the network status; or the video sending device may detect a current network status in real time, and if it is detected that the current network status has changed, the video sending device obtains an encoding bit rate that matches the current network status; or the video sending device may detect a current network status in real time, and obtain, based on the detected current network status, an encoding bit rate that matches the current network status.

Step B12: The video sending device obtains an encoding frame rate corresponding to the encoding bit rate.

The video sending device may pre-store a correspondence. The correspondence includes correspondences between different bit rate ranges and different encoding bit rates. The video sending device may determine, based on the correspondence, the encoding frame rate corresponding to the encoding bit rate.

Step B13: The video sending device obtains a preset frame rate corresponding to the indication information.

When the video sending device determines that the indication information meets a target condition, the video sending device determines a preset frame rate corresponding to the indication information. The target condition may be that the indication information indicates that the video receiving device has enabled the image super-resolution capability.

Step B14: The video sending device determines whether the encoding frame rate is greater than or equal to the preset frame rate; and if the encoding frame rate is not greater than or equal to the preset frame rate, performs step B15; or if the encoding frame rate is greater than or equal to the preset frame rate, performs step B16.

Step B15: The video sending device determines that the target frame rate is the preset frame rate.

When the video sending device determines that the encoding frame rate is less than the preset frame rate, the video sending device determines that the target frame rate is the preset frame rate.

Step B16: The video sending device determines that the target frame rate is the encoding frame rate.

When the video sending device determines that the encoding frame rate is greater than or equal to the preset frame rate, the video sending device determines that the target frame rate is the encoding frame rate.

Step B17: The video sending device determines the target resolution based on the target frame rate.

When the video sending device determines the target frame rate by performing step B15 or step B16, the video sending device may determine, based on the target frame rate, the target resolution corresponding to the target frame rate.

Step B18: The video sending device determines the target video having the target frame rate and the target resolution.

According to this aspect, the video sending device may preset the preset frame rate, and adjust the encoding frame rate by using the preset frame rate, to obtain the target frame rate. For example, when the video sending device determines that the encoding frame rate is less than the preset frame rate, the video sending device determines that the video receiving device can support a smoother video, and the video sending device adjusts the encoding frame rate that is less than the preset frame rate and determines that an adjusted encoding frame rate is the target frame rate. In other words, the adjusted target frame rate is greater than the encoding frame rate, so as to increase smoothness of the target video displayed by the video receiving device. When the video sending device determines that the encoding frame rate is greater than or equal to the preset frame rate, the video sending device determines that the video receiving device can smoothly display a video having the encoding frame rate. In this case, the video sending device does not need to adjust the encoding frame rate, and the video sending device directly determines that the encoding frame rate is the target frame rate.

With reference to the first aspect of the embodiments of the present disclosure, in an optional implementation of the first aspect of the embodiments of the present disclosure, the method in this aspect further includes step D:

Step D: The video sending device configures the preset frame rate based on the indication information.

When the indication information is used to indicate an image super-resolution multiplier supported by the video receiving device, the video sending device configures the preset frame rate based on the indication information. A value of the preset frame rate corresponds to the image super-resolution multiplier supported by the video receiving device. For example, there is a positive correlation between the value of the preset frame rate configured by the video sending device and the image super-resolution multiplier supported by the video receiving device.

In some embodiments, there is a positive correlation between the image super-resolution multiplier supported by the video receiving device and a video definition enhancement capability of the video receiving device. To be specific, a larger image super-resolution multiplier supported by the video receiving device indicates that the video receiving device has a stronger video definition enhancement capability. To balance video definition and smoothness, when the video receiving device has a relatively strong video definition enhancement capability, the video sending device may balance the video definition and smoothness by reducing the definition and compensating for the smoothness, so as to ensure that the video receiving device can smoothly display a video of certain definition.

According to this aspect, the video receiving device may determine that a larger image super-resolution multiplier supported by the video receiving device indicates a larger preset frame rate configured by the video sending device, so that a video resolution is reduced by using the larger preset frame rate. It can be learned that the video sending device may balance the video definition and smoothness by reducing the definition and compensating for the smoothness, so as to ensure that the video receiving device can smoothly display the video of a certain definition.

With reference to the first aspect of the embodiments of the present disclosure, in an optional implementation of the first aspect of the embodiments of the present disclosure, step B17 includes the following steps.

Step B171: The video sending device determines an average single-frame size based on the encoding bit rate and the target frame rate.

When the video sending device determines that the target frame rate is the preset frame rate, the video sending device may determine the average single-frame size based on the encoding bit rate and the target frame rate. The average single-frame size is a quantity of bytes included in each video frame.

Specifically, the video sending device may determine the average single-frame size according to the following formula:

Target frame rate=Encoding bit rate/Average single-frame size.

It can be learned that the video sending device substitutes the determined encoding bit rate and target frame rate into the formula to determine the average single-frame size.

Step B172: The video sending device determines that a resolution corresponding to the average single-frame size is the target resolution.

The video sending device has pre-created correspondences between different average single-frame sizes and different resolutions. In this case, the video sending device may determine the corresponding target resolution based on the determined average single-frame size.

According to this aspect, when the video sending device determines that the encoding frame rate is less than the preset frame rate, the video sending device determines that the video receiving device can support a smoother video, and the video sending device adjusts the encoding frame rate that is less than the preset frame rate and determines that an adjusted encoding frame rate is the target frame rate. In other words, an adjusted target frame rate is greater than the encoding frame rate, so as to increase smoothness of the target video displayed by the video receiving device. In addition, the video sending device determines the target resolution corresponding to the target frame rate, and determines, by using the target frame rate and the target resolution, the target video that can be sent to the video receiving device, so that the video receiving device can balance the smoothness and the definition of the displayed target video.

With reference to the first aspect of the embodiments of the present disclosure, in an optional implementation of the first aspect of the embodiments of the present disclosure, step B includes the following steps.

Step B21: The video sending device obtains a first correspondence and a second correspondence that correspond to the indication information.

The first correspondence includes correspondences between different bit rate ranges and different resolutions, and the second correspondence includes correspondences between different resolutions and different average single-frame sizes.

Step B22: The video sending device obtains an encoding bit rate that matches a network status.

Step B23: The video sending device determines, based on the first correspondence, that a resolution corresponding to the encoding bit rate is the target resolution.

Step B24: The video sending device determines, based on the second correspondence, that an average single-frame size corresponding to the target resolution is a target average single-frame size.

Step B25: The video sending device determines the target frame rate based on the target average single-frame size and the encoding bit rate.

Step B26: The video sending device adjusts the target video according to the target frame rate and the target resolution.

According to this aspect, when the video sending device determines that the image super-resolution capability of the video receiving device is enabled, the video sending device may update the stored correspondences, so that the video sending device can determine a larger target frame rate based on a same bit rate. The video sending device adjusts a frame rate and a resolution of the target video to be sent to the video receiving device, so that the target frame rate and the target resolution of the target video that are obtained after the adjustment match the image super-resolution capability of the video receiving device. The video sending device sends the target video to the video receiving device, and the video receiving device may display the target video whose definition and smoothness are balanced. Therefore, it is ensured that the video receiving device displays the high-definition target video, and the smoothness of displaying the target video is also effectively ensured.

With reference to the first aspect of the embodiments of the present disclosure, in an optional implementation of the first aspect of the embodiments of the present disclosure, the method further includes the following step:

Step B0: Step B0 is performed before step B, and step B0 is that the video sending device determines whether the multiplier indicated by the indication information is greater than 1, and if the multiplier indicated by the indication information is greater than 1, performs step B.

In some embodiments, if the indication information is further used to indicate the image super-resolution multiplier supported by the video receiving device, when the video sending device determines that the multiplier indicated by the indication information is greater than 1, the video sending device performs the step of obtaining a video having a target frame rate and a target resolution that correspond to the indication information.

With reference to the first aspect of the embodiments of the present disclosure, in an optional implementation of the first aspect of the embodiments of the present disclosure, the method further includes step A0, and step A0 is performed before step A.

Step A0: The video sending device sends request information to the video receiving device.

The request information is used to request the video receiving device to send the indication information. In this case, when the video receiving device receives the request information, the video receiving device may send the indication information to the video sending device.

With reference to the first aspect of the embodiments of the present disclosure, in an optional implementation of the first aspect of the embodiments of the present disclosure, the receiving indication information sent by a video receiving device includes: receiving, in a media negotiation process, the indication information sent by the video receiving device.

In this aspect, the media negotiation process may be performed between the video sending device and the video receiving device. Through the media negotiation process, the video sending device and the video receiving device may be connected, so that the video sending device and the video receiving device can perform media communication. In this case, the video receiving device may send the indication information to the video sending device in the process of performing media negotiation with the video sending device.

For example, the video receiving device may configure the indication information in a session description protocol (SDP) offer, and the video receiving device may set different values of parameters in the SDP offer to indicate different image super-resolution capabilities of the video receiving device. For example, when a value of a parameter, Multiple_flag, included in the SDP offer is 0, it indicates that the video receiving device does not have the image super-resolution capability; or when a value of a parameter, Multiple_flag, included in the SDP offer is 2, it indicates that the video receiving device supports the image super-resolution capability and a multiplier is 2. For another example, when a value of a parameter, Open_flag, included in the SDP offer is True, it indicates that the video receiving device has enabled the image super-resolution capability; or when a value of a parameter, Open_flag, included in the SDP offer is False, it indicates that the video receiving device has disabled the image super-resolution capability.

A second aspect of the embodiments of the present disclosure provides a video adaptation method, including the following steps.

Step A: A video receiving device sends indication information to a video sending device.

The indication information is used to indicate an image super-resolution capability of the video receiving device.

Step B: The video receiving device receives a target video sent by the video sending device.

If the indication information indicates that the image super-resolution capability of the video receiving device is enabled, the video receiving device receives the target video sent by the video sending device, where the target video is a video having a target frame rate and a target resolution, and the target frame rate and the target resolution correspond to the indication information.

In this aspect, the video receiving device may send the indication information to the video sending device, and the video sending device may adjust, based on the image super-resolution capability of the video receiving device, a frame rate and a resolution of the target video to be sent to the video receiving device, so that the target frame rate and the target resolution of the target video that are obtained after the adjustment match the image super-resolution capability of the video receiving device. The video sending device sends the target video to the video receiving device, and the video receiving device may display the target video whose definition and smoothness are balanced. Therefore, it is ensured that the video receiving device displays the high-definition target video, and the smoothness of displaying the target video is also effectively ensured.

With reference to the second aspect of the embodiments of the present disclosure, in an optional implementation of the second aspect of the embodiments of the present disclosure, step A includes the following steps:

Step A11: The video receiving device obtains an image super-resolution multiplier supported by the video receiving device.

Step A12: The video receiving device generates the indication information, where the indication information is used to indicate the image super-resolution multiplier supported by the video receiving device.

For an example process in which the video receiving device obtains the image super-resolution multiplier in this aspect, refer to the first aspect, and details are not described again.

With reference to the second aspect of the embodiments of the present disclosure, in an optional implementation of the second aspect of the embodiments of the present disclosure, before step A, the method further includes step A2, and step A2 is performed before step A.

Step A2: The video receiving device receives request information sent by the video sending device.

When the video receiving device receives the request information, the video receiving device may determine that the video sending device needs to obtain the indication information of the video receiving device.

Step A may be described as follows: The video receiving device sends the indication information to the video sending device based on the request information.

With reference to the second aspect of the embodiments of the present disclosure, in an optional implementation of the second aspect of the embodiments of the present disclosure, the video receiving device may send the indication information to the video sending device in a media negotiation process.

A third aspect of the embodiments of the present disclosure provides a video sending device, including:

a receiving unit, configured to receive indication information sent by a video receiving device, where the indication information is used to indicate an image super-resolution capability of the video receiving device;

an obtaining unit, configured to: if the indication information received by the receiving unit is used to indicate that the image super-resolution capability of the video receiving device is enabled, obtain a video having a target frame rate and a target resolution that correspond to the indication information; and a sending unit, configured to send the target video having the target frame rate and the target resolution to the video receiving device.

According to the video sending device in this aspect, the video sending device may adjust, based on the image super-resolution capability of the video receiving device, a frame rate and a resolution of the target video to be sent to the video receiving device, so that the target frame rate and the target resolution of the target video that are obtained after the adjustment match the image super-resolution capability of the video receiving device. The video sending device sends the target video to the video receiving device, and the video receiving device may display the target video whose definition and smoothness are balanced. Therefore, it is ensured that the video receiving device displays the high-definition target video, and the smoothness of displaying the target video is also effectively ensured.

With reference to the third aspect of the embodiments of the present disclosure, in an optional implementation of the third aspect of the embodiments of the present disclosure, the obtaining unit includes:

a first obtaining module, configured to obtain an encoding bit rate that matches a network status;

a second obtaining module, configured to obtain an encoding frame rate corresponding to the encoding bit rate;

a third obtaining module, configured to obtain a preset frame rate corresponding to the indication information;

a fourth obtaining module, configured to: if the encoding frame rate is less than the preset frame rate, determine that the target frame rate is the preset frame rate;

a fifth obtaining module, configured to: if the encoding frame rate is greater than or equal to the preset frame rate, determine that the target frame rate is the encoding frame rate;

a sixth obtaining module, configured to determine the target resolution based on the target frame rate; and a seventh obtaining module, configured to obtain the video having the target frame rate and the target resolution.

With reference to the third aspect of the embodiments of the present disclosure, in an optional implementation of the third aspect of the embodiments of the present disclosure, the video sending device further includes:

a configuration unit, configured to: if the indication information is used to indicate an image super-resolution multiplier supported by the video receiving device, configure the preset frame rate based on the indication information, where a value of the preset frame rate corresponds to the image super-resolution multiplier supported by the video receiving device.

With reference to the third aspect of the embodiments of the present disclosure, in an optional implementation of the third aspect of the embodiments of the present disclosure, there is a positive correlation between the value of the preset frame rate and the image super-resolution multiplier supported by the video receiving device.

With reference to the third aspect of the embodiments of the present disclosure, in an optional implementation of the third aspect of the embodiments of the present disclosure, the sixth obtaining module is specifically configured to: if the target frame rate is the preset frame rate, determine an average single-frame size based on the encoding bit rate and the target frame rate, where the average single-frame size is a quantity of bytes included in each video frame; and determine that a resolution corresponding to the average single-frame size is the target resolution.

With reference to the third aspect of the embodiments of the present disclosure, in an optional implementation of the third aspect of the embodiments of the present disclosure, the obtaining unit includes:

an eighth obtaining module, configured to obtain a first correspondence and a second correspondence that correspond to the indication information, where the first correspondence includes correspondences between different bit rate ranges and different resolutions, and the second correspondence includes correspondences between different resolutions and different average single-frame sizes;

a ninth obtaining module, configured to obtain an encoding bit rate that matches a network status;

a tenth obtaining module, configured to determine, based on the first correspondence, that a resolution corresponding to the encoding bit rate is the target resolution;

an eleventh obtaining module, configured to determine, based on the second correspondence, that an average single-frame size corresponding to the target resolution is a target average single-frame size;

a twelfth obtaining module, configured to determine the target frame rate based on the target average single-frame size and the encoding bit rate; and a thirteenth obtaining module, configured to obtain the video having the target frame rate and the target resolution.

With reference to the third aspect of the embodiments of the present disclosure, in an optional implementation of the third aspect of the embodiments of the present disclosure, if the indication information is further used to indicate the image super-resolution multiplier supported by the video receiving device, the obtaining unit is further configured to: when it is determined that the multiplier indicated by the indication information is greater than 1, perform the step of obtaining a video having a target frame rate and a target resolution that correspond to the indication information.

With reference to the third aspect of the embodiments of the present disclosure, in an optional implementation of the third aspect of the embodiments of the present disclosure, the sending unit is further configured to send request information to the video receiving device, where the request information is used to request the video receiving device to send the indication information.

With reference to the third aspect of the embodiments of the present disclosure, in an optional implementation of the third aspect of the embodiments of the present disclosure, the receiving unit is further configured to receive, in a media negotiation process, the indication information sent by the video receiving device.

A fourth aspect of the embodiments of the present disclosure provides a video receiving device, including:

a sending unit, configured to send indication information to a video sending device, where the indication information is used to indicate an image super-resolution capability of the video receiving device; and a receiving unit, configured to: if the indication information indicates that the image super-resolution capability of the video receiving device is enabled, receive a video that is sent by the video sending device and that has a target frame rate and a target resolution, where the target frame rate and the target resolution correspond to the indication information.

With reference to the fourth aspect of the embodiments of the present disclosure, in an optional implementation of the fourth aspect of the embodiments of the present disclosure, the video receiving device specifically includes:

an obtaining unit, configured to obtain an image super-resolution multiplier supported by the video receiving device; and a generation unit, configured to generate the indication information, where the indication information is used to indicate the image super-resolution multiplier supported by the video receiving device.

With reference to the fourth aspect of the embodiments of the present disclosure, in an optional implementation of the fourth aspect of the embodiments of the present disclosure, the receiving unit is further configured to receive request information sent by the video sending device.

The sending unit is further configured to send the indication information to the video sending device based on the request information.

With reference to the fourth aspect of the embodiments of the present disclosure, in an optional implementation of the fourth aspect of the embodiments of the present disclosure, the sending unit is specifically configured to send the indication information to the video sending device in a media negotiation process.

A fifth aspect of the embodiments of the present disclosure provides an electronic device, including one or more processors, a memory, a communications bus, and one or more programs. The processor and the memory are connected through the communications bus.

The one or more programs are stored in the memory, the one or more programs include instructions, and when the instructions are executed by the electronic device, the electronic device is enabled to perform the method according to the first aspect of the embodiments of the present disclosure; or when the instructions are executed by the electronic device, the electronic device is enabled to perform the method according to the second aspect of the embodiments of the present disclosure.

A sixth aspect of the embodiments of the present disclosure provides a computer-readable storage medium storing one or more programs. The one or more programs include instructions, and when the instructions are executed by an electronic device, the electronic device is enabled to perform the method according to the first aspect of the embodiments of the present disclosure; or when the instructions are executed by an electronic device, the electronic device is enabled to perform the method according to the second aspect of the embodiments of the present disclosure.

DESCRIPTION OF EMBODIMENTS

Figures 1, 2A:
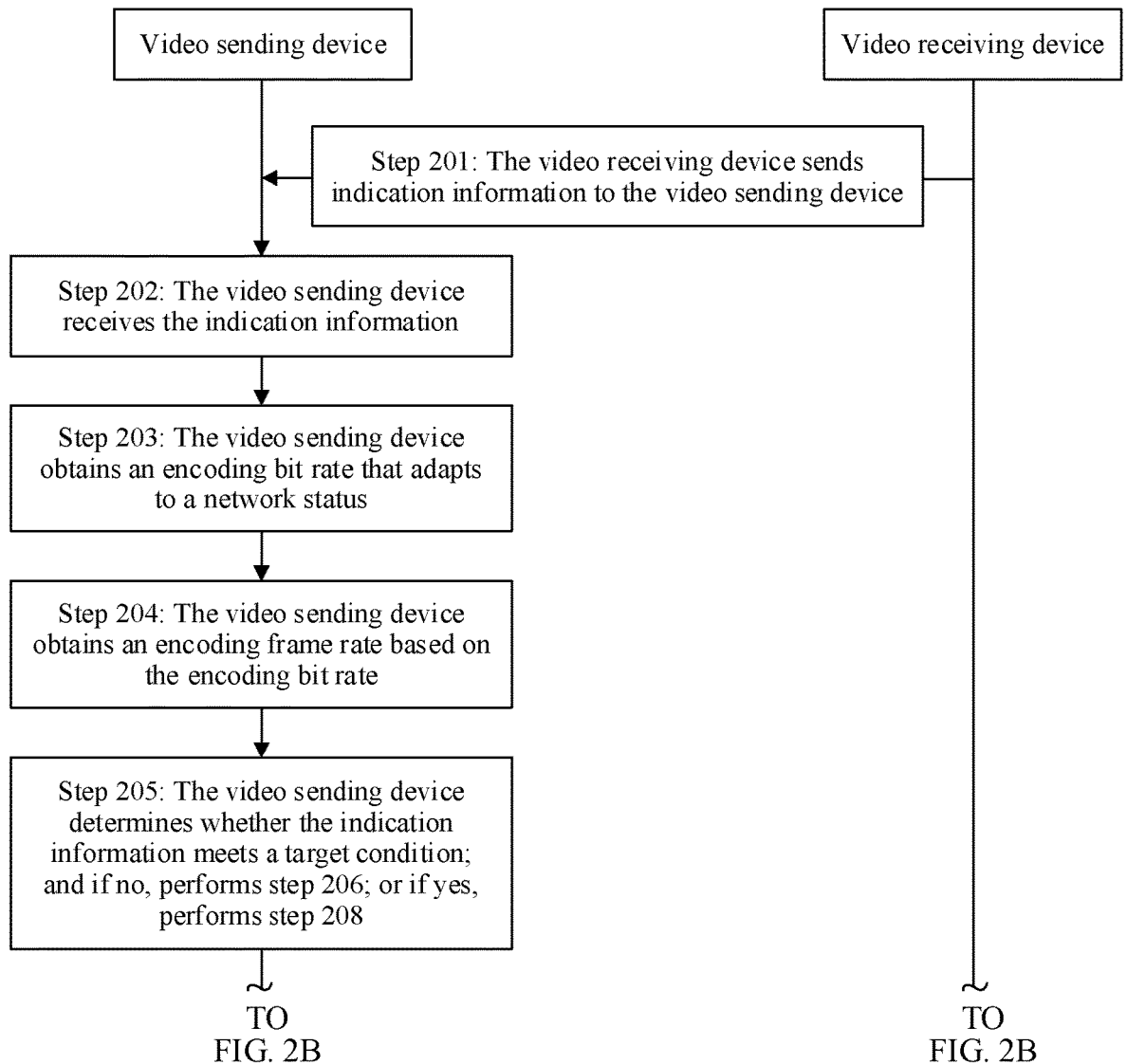
FIG. 1 is a schematic structural diagram of an embodiment of a video network according to the present disclosure.
FIG. 2A and FIG. 2B are a flowchart of steps of an embodiment of a video adaptation method according to the present disclosure.

With reference to FIG. 1, the following first describes an example of a video network provided in this embodiment. As shown in FIG. 1, it can be learned that the video network includes a video sending device 101 and a video receiving device 102.

The video sending device 101 and the video receiving device 102 are configured to perform a video adaptation method in this application, so that the video sending device 101 can adjust a video based on an image super-resolution capability of the video receiving device 102 to balance definition and smoothness of the video, and send the adjusted video to the video receiving device 102. This effectively ensures the definition and the smoothness of the video displayed by the video receiving device 102.

Specific device types of the video sending device 101 and the video receiving device 102 are not limited in this embodiment. For example, in a multipoint video session scenario, the video sending device 101 may be a multipoint control unit (MCU), or the video sending device may be a video media server. The video receiving device 102 may be a terminal. The terminal may be a smartphone, a cellular phone having a video call function, a cordless telephone set, a session initiation protocol (SIP) phone, a personal digital assistant (PDA) device, a vehicle-mounted device, a wearable device, a set-top box, or the like. For another example, in a point-to-point scenario, both the video sending device 101 and the video receiving device 102 may be terminals.

Figure 2B:
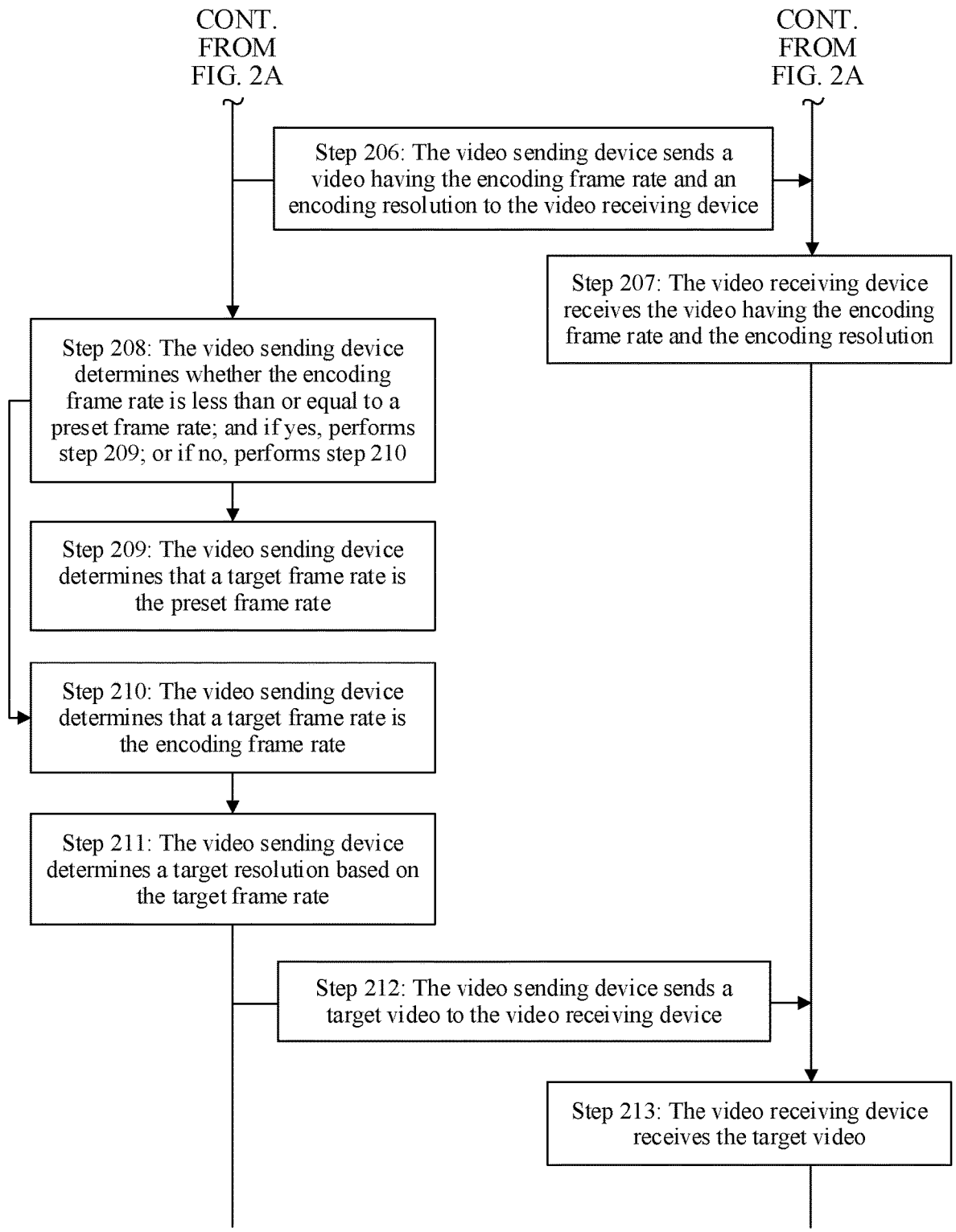

Based on the video network shown in FIG. 1, the following describes an example of a specific execution procedure of a video adaptation method in this embodiment with reference to FIG. 2A and FIG. 2B.

Step 201: The video receiving device sends indication information to the video sending device.

The indication information in this embodiment is used to indicate an image super-resolution capability of the video receiving device. Specifically, the indication information is used to indicate whether the video receiving device has the image super-resolution capability and/or whether the image super-resolution capability is enabled.

For example, the indication information is used to indicate that the video receiving device has the image super-resolution capability. For another example, the indication information is used to indicate that the video receiving device has the image super-resolution capability and the image super-resolution capability is enabled. For another example, the indication information is used to indicate that the video receiving device has the image super-resolution capability and the image super-resolution capability is not enabled. For another example, the indication information is used to indicate that the image super-resolution capability of the video receiving device is enabled. For another example, the indication information is used to indicate that the image super-resolution capability of the video receiving device is not enabled.

Step 202: The video sending device receives the indication information.

Optionally, in a process in which the video receiving device and the video sending device perform media negotiation, the video receiving device sends the indication information to the video sending device. The video receiving device and the video sending device create a session initiation protocol (SIP) session through the media negotiation, so that the video sending device and the video receiving device establish a connection to perform media communication.

Optionally, the video sending device may send a request message to the video receiving device in advance before receiving the indication information. The request information is used to request the video receiving device to send the indication information. When the video receiving device receives the request message, the video receiving device sends the indication information to the video sending device.

A specific message type of the indication information is not limited in this embodiment, provided that the indication information can indicate the image super-resolution capability of the video receiving device. For example, the indication information may be a parameter included in an SDP offer, and different values of parameters included in the SDP offer are used to indicate different image super-resolution capabilities of the video receiving device.

Step 203: The video sending device obtains an encoding bit rate that matches a network status.

The network status in this embodiment may be at least one of the following: a bandwidth, a packet loss, a delay, jitter, or the like.

The video sending device may obtain the foregoing network status by using a bandwidth detection technology. When the video sending device obtains the network status, the video sending device obtains the encoding bit rate that matches the network status, and the video sending device may obtain a target frame rate based on the encoding bit rate, so that the video sending device can send a target video having the target frame rate to the video receiving device.

The following describes examples of several optional cases in which the video sending device obtains the encoding bit rate.

Optionally, when initially establishing a communication connection to the video receiving device, the video sending device may obtain the encoding bit rate that matches the network status.

Optionally, the video sending device may detect a current network status in real time, and if it is detected that the current network status changes, the video sending device obtains an encoding bit rate that matches the current network status.

Optionally, the video sending device may detect a current network status in real time, and obtain, based on the detected current network status, an encoding bit rate that matches the current network status.

Step 204: The video sending device obtains an encoding frame rate based on the encoding bit rate.

Specifically, the video sending device may pre-create a first correspondence and a second correspondence, and the video sending device determines the encoding frame rate based on the created first correspondence and second correspondence. More specifically, the first correspondence may be shown in Table 1. The first correspondence includes correspondences between different bit rate ranges and different resolutions.

TABLE 1

| Bit rate range | Resolution |
| --- | --- |
| 64 kb/s (kb/s) to 256 kb/s | CIF |
| 256 kb/s to 810 kb/s | VGA |
| 810 kb/s to 2100 kb/s | 720 P |
| 2100 kb/s to 4096 kb/s | 1080 P |

Based on the first correspondence, the video sending device may first determine a bit rate range in which the encoding bit rate is located, so as to determine a corresponding resolution. In this embodiment, the resolution corresponding to the encoding bit rate is referred to as an encoding resolution. For example, if the video sending device determines that the encoding bit rate is 2000 kb/s, the video sending device determines that the bit rate range in which the encoding bit rate is located is 810 kb/s to 2100 kb/s, and the video sending device determines that the corresponding encoding resolution is 720 P.

It should be noted that a specific correspondence included in the first correspondence is not limited in this embodiment, provided that the video sending device can determine the corresponding resolution based on the encoding bit rate.

When the video sending device determines the encoding resolution corresponding to the encoding bit rate, the video sending device may determine, based on the second correspondence, an average single-frame size corresponding to the encoding resolution. For the second correspondence in this embodiment, refer to Table 2. The second correspondence shown in Table 2 includes correspondences between different resolutions and different average single-frame sizes. The average single-frame size is a quantity of bytes included in each video frame. In other words, the video sending device may determine, based on the second correspondence shown in Table 2, the average single-frame size corresponding to the encoding resolution.

TABLE 2

| Resolution | Average single-frame size |
| --- | --- |
| CIF | 10 kb/f |
| VGA | 27 kb/f |
| 720 P | 70 kb/f |
| 1080 P | 120 kb/f |

For example, when the video sending device determines that the encoding resolution is 720 P, the video sending device determines, based on the second correspondence shown in Table 2, that the corresponding average single-frame size is 70 kb/f.

The video sending device may substitute the determined encoding bit rate and the average single-frame size that corresponds to the encoding bit rate and that is determined according to Table 1 and Table 2 into the following formula to obtain the encoding frame rate:

Encoding frame rate=Encoding bit rate/Average single-frame size.

It can be learned from the foregoing examples that, when the video sending device determines that the encoding bit rate is 2000 kb/s, and determines, based on the first correspondence and the second correspondence shown above, that the average single-frame size corresponding to the encoding bit rate is 70 kb/f, the video sending device determines that the encoding frame rate is: 2000 kb/s/70 kb/f=28.57 f/s (f/s).

Step 205: The video sending device determines whether the indication information meets a target condition; and if the indication information does not meet the target condition, performs step 206; or if the indication information meets the target condition, performs step 208.

In this embodiment, when the video sending device receives the indication information, the video sending device determines whether the indication information meets the target condition. The target condition is that the indication information is used to indicate that the video receiving device has enabled the image super-resolution capability.

For example, when the video sending device determines that the indication information indicates that the video receiving device has the image super-resolution capability and the image super-resolution capability is enabled, or the indication information is used to indicate that the image super-resolution capability of the video receiving device is enabled, the video sending device determines that the indication information meets the target condition.

For another example, when the video sending device determines that the indication information indicates that the video receiving device has the image super-resolution capability and the image super-resolution capability is not enabled, or the indication information is used to indicate that the image super-resolution capability of the video receiving device is not enabled, the video sending device determines that the indication information does not meet the target condition.

For another example, if the video sending device determines that the indication information indicates that the video receiving device has the image super-resolution capability, but the video sending device does not determine whether the video receiving device enables the image super-resolution capability, the video sending device may send a first message to the video receiving device, where the first message is used to request the video receiving device to send a second message to the video sending device, and the second message is used to indicate whether the video receiving device enables the image super-resolution capability. In this case, when the video sending device determines that the second message is used to indicate that the video receiving device has enabled the image super-resolution capability, the video sending device determines that the indication information meets the target condition; or if the video sending device determines that the second message is used to indicate that the video receiving device does not enable the image super-resolution capability, the video sending device determines that the indication information does not meet the target condition.

Optionally, the indication information in this embodiment is further used to indicate an image super-resolution multiplier supported by the video receiving device. In this case, the target condition in this embodiment may alternatively be that the image super-resolution multiplier indicated by the indication information is greater than 1.

The image super-resolution multiplier is a multiple obtained by dividing a pixel width of a video obtained after the original video is processed by using an image super-resolution technology by a pixel width of the original video, or a multiple obtained by dividing a pixel height of a video obtained after the original video is processed by using an image super-resolution technology by a pixel height of the original video. For example, the pixel width of the original video is 540, and the pixel height is 360; and the width of the video obtained after the video is processed by using the image super-resolution technology is 1080, and the pixel height is 720. It can be learned that the image super-resolution multiplier is: 1080/540=2, or the image super-resolution multiplier is: 720/360=2.

An example in which an original video is amplified at a same ratio by using the image super-resolution technology is used for description above, to be specific, an example in which a multiple for amplifying a pixel width of the original video is the same as a multiple for amplifying a pixel height of the original video is used for description. In another embodiment, the original video may be amplified at different ratios by using the image super-resolution technology. For example, a first multiple is obtained by dividing the pixel width of the video obtained after the original video is processed by using the image super-resolution technology by the pixel width of the original video, a second multiple is obtained by dividing the pixel height of the video obtained after the original video is processed by using the image super-resolution technology by the pixel height of the original video, and the first multiple is different from the second multiple.

Optionally, the video receiving device may determine a smaller value between the first multiple and the second multiple, and use the smaller value between the first multiple and the second multiple as the image super-resolution multiplier.

Optionally, the video receiving device may determine a larger value between the first multiple and the second multiple, and use the larger value between the first multiple and the second multiple as the image super-resolution multiplier.

Step 206: The video sending device sends a video having the encoding frame rate and the encoding resolution to the video receiving device.

In this embodiment, when the video sending device determines that the video receiving device does not meet the target condition, the image super-resolution capability of the video receiving device does not need to be considered for the video sent by the video sending device, and the video sending device may directly send the video having the encoding frame rate and the encoding resolution to the video receiving device.

Step 207: The video receiving device receives the video having the encoding frame rate and the encoding resolution.

Step 208: The video sending device determines whether the encoding frame rate is less than or equal to a preset frame rate; and if the encoding frame rate is less than or equal to the preset frame rate, performs step 209; or if the encoding frame rate is not less than or equal to the preset frame rate, performs step 210.

In this embodiment, when the video sending device determines that the video receiving device meets the target condition, the image super-resolution capability of the video receiving device needs to be considered for the video sent by the video sending device.

The video sending device in this embodiment may preconfigure the preset frame rate, and a specific value of the preset frame rate is not limited in this embodiment. The preset frame rate configured by the video sending device in this embodiment corresponds to the indication information. Specifically, the video sending device in this embodiment may configure the preset frame rate based on the image super-resolution multiplier supported by the video receiving device.

More specifically, the preset frame rate configured by the video sending device corresponds to the image super-resolution multiplier supported by the video receiving device. In this case, when the video sending device receives the indication information including the image super-resolution multiplier, the video sending device determines the preset frame rate corresponding to the image super-resolution multiplier supported by the video receiving device.

The following describes an example of a process in which the video sending device configures the preset frame rate. It should be noted that the following description of configuring the preset frame rate is an optional example, and no limitation is imposed, provided that the preset frame rate corresponds to the image super-resolution multiplier.

For example, there is a positive correlation between the value of the preset frame rate configured by the video sending device and the image super-resolution multiplier supported by the video receiving device.

For another example, the video sending device may configure a third correspondence, and the third correspondence includes correspondences between different preset frame rates and different image super-resolution multiplier ranges. For the third correspondence, refer to Table 3. It can be learned from Table 3 that, in the correspondences included in the third correspondence, there are positive correlations between values of the preset frame rate configured by the video sending device and different image super-resolution multiplier ranges supported by the video receiving device. To be specific, a larger image super-resolution multiplier range included in the third correspondence corresponds to a larger preset frame rate. Still using Table 3 as an example, a preset frame rate (20) corresponding to an image super-resolution multiplier that is located in a range from 4 to 5 is greater than a preset frame rate (15) corresponding to an image super-resolution multiplier that is located in a range from 2 to 3.

TABLE 3

| Image super-resolution multiplier range | Greater than or equal to 2 and less than or equal to 3 | Greater than or equal to 4 and less than or equal to 5 |
|---|---|---|
| Preset frame rate | 15 | 20 |

It can be learned from the foregoing descriptions of the image super-resolution multiplier that there is a positive correlation between the image super-resolution multiplier supported by the video receiving device and a video definition enhancement capability of the video receiving device. To be specific, a larger image super-resolution multiplier supported by the video receiving device indicates that the video receiving device has a stronger video definition enhancement capability. To balance video definition and smoothness, when the video receiving device has a relatively strong video definition enhancement capability, the video sending device may balance the video definition and smoothness by reducing the definition and compensating for the smoothness, so as to ensure that the video receiving device can smoothly display a video of a specific definition.

Specifically, the video receiving device may determine that a larger image super-resolution multiplier supported by the video receiving device indicates a larger preset frame rate configured by the video sending device, so that a video resolution is reduced by using the larger preset frame rate.

Step 209: The video sending device determines that the target frame rate is the preset frame rate.

In this embodiment, when the video sending device determines that the encoding frame rate is less than the preset frame rate, the video sending device determines that the video receiving device can support a smoother video, and the video sending device adjusts the encoding frame rate that is less than the preset frame rate and determines that an adjusted encoding frame rate is the target frame rate. The target frame rate is equal to the preset frame rate. It can be learned that, when the encoding frame rate is less than the preset frame rate, the video sending device adjusts the encoding frame rate to enable the adjusted encoding frame rate to be equal to the preset frame rate.

In this embodiment, an example in which the target frame rate is equal to the preset frame rate is used for description, and no limitation is imposed, provided that the target frame rate determined by the video sending device is greater than or equal to the preset frame rate.

Step 210: The video sending device determines that the target frame rate is the encoding frame rate.

When the video sending device determines that the encoding frame rate is greater than or equal to the preset frame rate, the video sending device determines that the video receiving device can smoothly display a video having the encoding frame rate. In this case, the video sending device does not need to adjust the encoding frame rate, and the video sending device directly determines that the encoding frame rate is the target frame rate.

Step 211: The video sending device determines a target resolution based on the target frame rate.

In this embodiment, when the video sending device determines the target frame rate, the video sending device may determine the target resolution corresponding to the target frame rate.

Optionally, after the video sending device performs step 209, to be specific, when the video sending device adjusts the encoding frame rate to enable the adjusted encoding frame rate (the target frame rate) to be equal to the preset frame rate, the video sending device determines the target resolution based on the target frame rate.

An example determining process is described as follows:

First, the video sending device may calculate the average single-frame size according to the following formula:

Target frame rate=Encoding bit rate/Average single-frame size.

The video sending device has determined the encoding bit rate in step 203. In this case, the video sending device substitutes the determined encoding bit rate and the target frame rate into the formula to determine the average single-frame size.

Then, the video sending device determines, based on the second correspondence shown in Table 2, that a resolution corresponding to the average single-frame size is the target resolution.

Step 212: The video sending device sends the target video to the video receiving device.

In this embodiment, when the video sending device determines the target frame rate and the target resolution, the video sending device may adjust a frame rate and a resolution of the collected target video to be sent to the video receiving device, so that a frame rate of the target video is the target frame rate and a resolution of the target video is the target resolution, and the video sending device sends the target video having the target frame rate and the target resolution that are obtained after the adjustment to the video receiving device.

Step 213: The video receiving device receives the target video.

The video receiving device may process the target video by using the image super-resolution technology, to enhance the definition of the target video, so that the video receiving device can ensure, to a maximum extent in an existing network status, the definition and smoothness of the target video displayed by the video receiving device.

According to the video adaptation method in this embodiment, the video sending device may adjust, based on the image super-resolution capability of the video receiving device, the frame rate and the resolution of the target video to be sent to the video receiving device, so that the target frame rate and the target resolution of the target video that are obtained after the adjustment match the image super-resolution capability of the video receiving device. The video sending device sends the target video to the video receiving device, and the video receiving device may display the target video whose definition and smoothness are balanced. Therefore, it is ensured that the video receiving device displays the high-definition target video, and the smoothness of displaying the target video is also effectively ensured.

According to the embodiment in FIG. 2A and FIG. 2B, the video sending device may adjust the frame rate of the target video by setting the preset frame rate, to implement the video adaptation method. With reference to an embodiment in FIG. 3A and FIG. 3B, the following describes an example of another method in which the video sending device determines the target frame rate and the target resolution based on the indication information.

Step 301: The video receiving device sends the indication information to the video sending device.

Step 302: The video sending device receives the indication information.

Step 303: The video sending device obtains an encoding bit rate that matches a network status.

For a specific execution process of step 301 to step 303 in this embodiment, refer to that of step 201 to step 203 in FIG. 2A and FIG. 2B, and the specific execution process is not limited.

Step 304: The video sending device determines whether the indication information meets a target condition; and if the indication information does not meet the target condition, performs step 305; or if the indication information meets the target condition, performs step 308.

For a specific process in which the video sending device determines whether the video receiving device meets the target condition in this embodiment, refer to step 205 in FIG. 2A and FIG. 2B, and details are not described in this embodiment again.

Step 305: The video sending device obtains an encoding frame rate based on the encoding bit rate.

For a specific execution process of step 305 in this embodiment, refer to that of step 204 in FIG. 2A and FIG. 2B, and details are not described again.

Step 306: The video sending device sends a video having the encoding frame rate and an encoding resolution to the video receiving device.

Step 307: The video receiving device receives the video having the encoding frame rate and the encoding resolution.

For a specific execution process of step 306 and step 307 in this embodiment, refer to that of step 206 and step 207 in FIG. 2A and FIG. 2B, and the specific execution process is not described again.

Step 308: The video sending device obtains a first correspondence and a second correspondence that correspond to the indication information.

In this embodiment, when the video sending device determines that the video receiving device meets the target condition, an image super-resolution capability of the video receiving device needs to be considered for the video sent by the video sending device.

Specifically, the video sending device may obtain the first correspondence corresponding to the indication information that meets the target condition. The first correspondence corresponding to the indication information that meets the target condition may be pre-stored in the video sending device. Alternatively, the video sending device may obtain the corresponding first correspondence when receiving the indication information that meets the target condition. This is not specifically limited in this embodiment.

The following describes an example of a process in which the video sending device obtains the first correspondence corresponding to the indication information that meets the target condition.

The video sending device updates the first correspondence (Table 1) in the foregoing embodiment based on the indication information. For an updated first correspondence, refer to Table 4.

TABLE 4

| Bit rate range | Resolution |
| --- | --- |
| 64 kb/s to 384 kb/s | CIF |
| 384 kb/s to 1024 kb/s | VGA |
| 1024 kb/s to 2400 kb/s | 720 P |
| 2400 kb/s to 4096 kb/s | 1080 P |

With reference to Table 1 and Table 4, it can be learned that the video sending device in this embodiment may update the first correspondence based on Table 1. Therefore, compared with the first correspondence (Table 1) obtained before the updating, a same resolution corresponds to a larger bit rate range in the updated first correspondence (Table 4). For example, in Table 1, the bit rate range corresponding to the resolution "VGA" is "256 kb/s to 810 kb/s". However, in this embodiment, the bit rate range corresponding to the resolution "VGA" included in the first correspondence configured by the video sending device may be "384 kb/s to 1024 kb/s".

It can be learned that a same bit rate may correspond to a lower resolution in the updated first correspondence. For example, if the encoding bit rate determined by the video sending device is "2400 kb/s", it may be determined that the corresponding resolution is "1080 P" in the first correspondence shown in Table 1, but it is determined that the corresponding resolution is "720 P" in the updated first correspondence in this embodiment.

For a description of the second correspondence, refer to Table 2 in the foregoing embodiment, and details are not described in this embodiment again. It can be learned from Table 2 that there is a positive correlation between a resolution size and an average single-frame size. In this case, compared with the embodiment in FIG. 2A and FIG. 2B, in the embodiment in FIG. 3A and FIG. 3B, a same encoding bit rate may correspond to a smaller average single-frame size. An example in which the encoding bit rate is "2400 kb/s" is still used. In this case, it is determined that the average single-frame size corresponding to the encoding bit rate "2400 kb/s" is "120 kb/f" in the embodiment in FIG. 2A and FIG. 2B, but it is determined that the average single-frame size corresponding to the encoding bit rate "2400 kb/s" is "70 kb/f" in this embodiment.

Step 309: The video sending device determines the target resolution.

Specifically, the video sending device in this embodiment may determine, based on the first correspondence, that a resolution corresponding to the encoding bit rate is the target resolution. As shown in the foregoing example, if the video sending device determines that the encoding bit rate is "2400 kb/s", the target resolution may be "720 P".

Step 310: The video sending device determines the target frame rate.

In this embodiment, when the video sending device determines the target resolution, the video sending device may determine a target average single-frame size based on the second correspondence. It can be learned from the foregoing descriptions that the average single-frame size may be "70 kb/f".

The video sending device calculates the target frame rate according to the following formula:

Target frame rate=Encoding bit rate/Target average single-frame size.

It can be learned from the foregoing formula that the target frame rate is inversely proportional to the target average single-frame size. In this case, the video sending device may determine a lower target average single-frame size based on a same encoding bit rate. It can be learned that, based on different correspondences in Table 1 and Table 4, the video sending device in this embodiment can determine a larger target frame rate based on a same encoding bit rate, so that smoothness of the video displayed by the video receiving device is improved by using the larger target frame rate.

Step 311: The video sending device sends the target video to the video receiving device.

Step 312: The video receiving device receives the target video.

For an execution process of step 311 and step 312 in this embodiment, refer to that of step 212 and step 213 in the embodiment in FIG. 2A and FIG. 2B, and the specific execution process is not described in this embodiment again.

According to the video adaptation method in this embodiment, when the video sending device determines that the image super-resolution capability of the video receiving device is enabled, the video sending device may update the stored correspondences, so that the video sending device can determine a larger target frame rate based on a same bit rate. The video sending device adjusts a frame rate and a resolution of the target video to be sent to the video receiving device, so that the target frame rate and the target resolution of the target video that are obtained after the adjustment match the image super-resolution capability of the video receiving device. The video sending device sends the target video to the video receiving device, and the video receiving device may display the target video whose definition and smoothness are balanced. Therefore, it is ensured that the video receiving device displays the high-definition target video, and the smoothness of displaying the target video is also effectively ensured.

To better understand the video adaptation method provided in this application, the following further describes an example of an execution process of the video adaptation method with reference to an application scenario.

Figure 4:
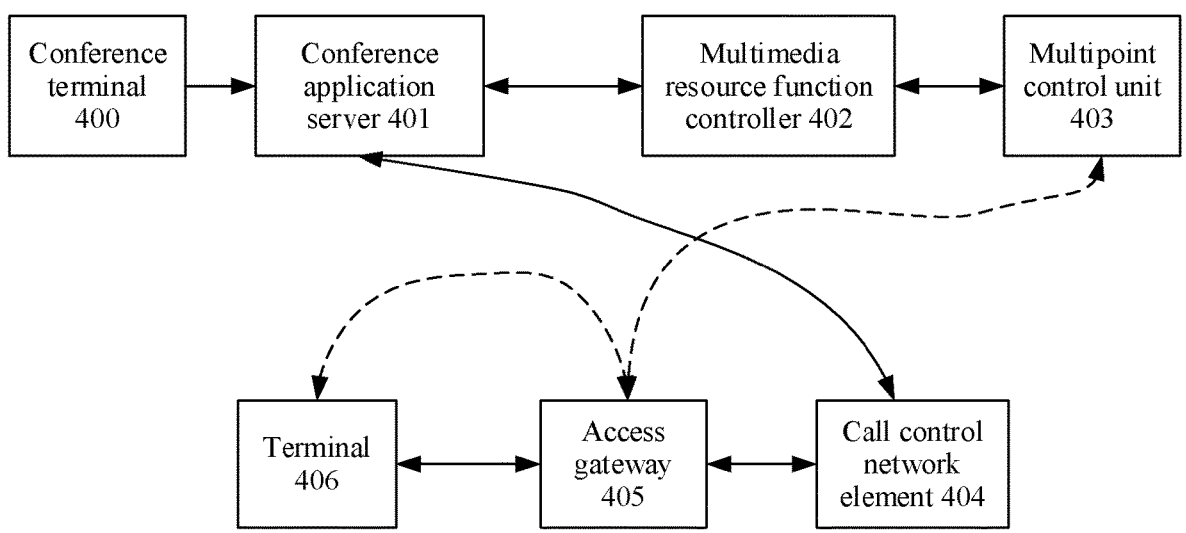
FIG. 4 is an example diagram of a video network structure in a multipoint video session scenario according to the present disclosure.

Referring to an application scenario in FIG. 4, FIG. 4 is an example diagram of a video network structure in a multipoint video session scenario according to the present disclosure.

As shown in FIG. 4, when a video network is applied to the multipoint video session scenario, the video network includes a conference terminal 400 configured to initiate a multipoint video session, a conference application server (AS) 401, a multimedia resource function controller (MRFC) 402, a multipoint control unit (MCU) 403, a call control network element 404, an access gateway 405, and a terminal 406. The MCU 403 serves as a video sending device, and the terminal 406 serves as a video receiving device. The multipoint video session scenario is used for a multimedia conference, remote teaching, multimedia publishing, and the like. This is not specifically limited.

Specific device type of the conference terminal 400 and the terminal 406 are not limited in this embodiment. The conference terminal 400 and the terminal 406 each may be a smartphone, a cellular phone having a video call function, a cordless telephone set, a session initiation protocol (SIP) phone, a personal digital assistant (PDA) device, a vehicle-mounted device, a wearable device, or the like.

Specifically, the conference AS 401 is a network element at a service capability layer, and may provide a multimedia conference service that is based on an internet protocol (IP) multimedia subsystem (IMS) network, complete scheduling of a voice conference, a data conference, and a video conference, and provide global wide area network or world wide web (WWW) interface-based configuration and management services.

The MRFC 402 may control a media resource on a multimedia resource function processor (MRFP) through the H.248 protocol. The MRFP is a logical function entity located at an access layer, and mainly provides and bears the multimedia resource. The MRFC 402 is a logical function entity located at a control layer, and mainly controls the multimedia resource in the MRFP. The MRFC 402 is configured to: resolve a session initiation protocol (SIP) resource control command from the conference AS 401; convert the SIP resource control command into a control command for the MRFP; and generate corresponding charging information, where SIP is an IP telephony signaling protocol proposed by the Internet Engineering Task Force (IETF) and is used to manage a network video session. The MCU 403 is located at a core switching position in a multipoint video conference network structure, and the MCU 403 is configured to: extract information and instructions such as audio, videos, and data from information streams of conference sites after synchronous separation; then send the information and the instructions of the conference sites to a same processing module to complete corresponding processes such as audio mixing or switching, video mixing or switching, data broadcasting and routing selection, and timing and conference control; and finally recombine information required by the conference sites and send the information to corresponding terminals. The call control network element 404 performs a signaling operation for call session control, manages a SIP session, and cooperates with another network entity to perform session control, service control, and resource allocation.

The access gateway 405 provides an analog subscriber line interface, and is configured to: directly connect an ordinary telephone user to a soft-switch or an IMS network; and provide all services of a public switched telephone network (PSTN), for example, a telephone service and a dial-up access service. The access gateway 405 may directly encapsulate user data and user signaling in an IP packet.

Still referring to FIG. 4, a signaling channel (shown by a solid line part in FIG. 4) may be formed between the conference terminal 400, the conference AS 401, the MRFC 402, and the MCU 403 and between the conference AS 401, the call control network element 404, the access gateway 405, and the terminal 406, and the signaling channel is responsible for media negotiation control; and a bearer channel (shown by a dashed line part in FIG. 4) may be formed between the MCU 403, the access gateway 405, and the terminal 406, and the bearer channel is responsible for transmitting a media stream.

Figure 5A:
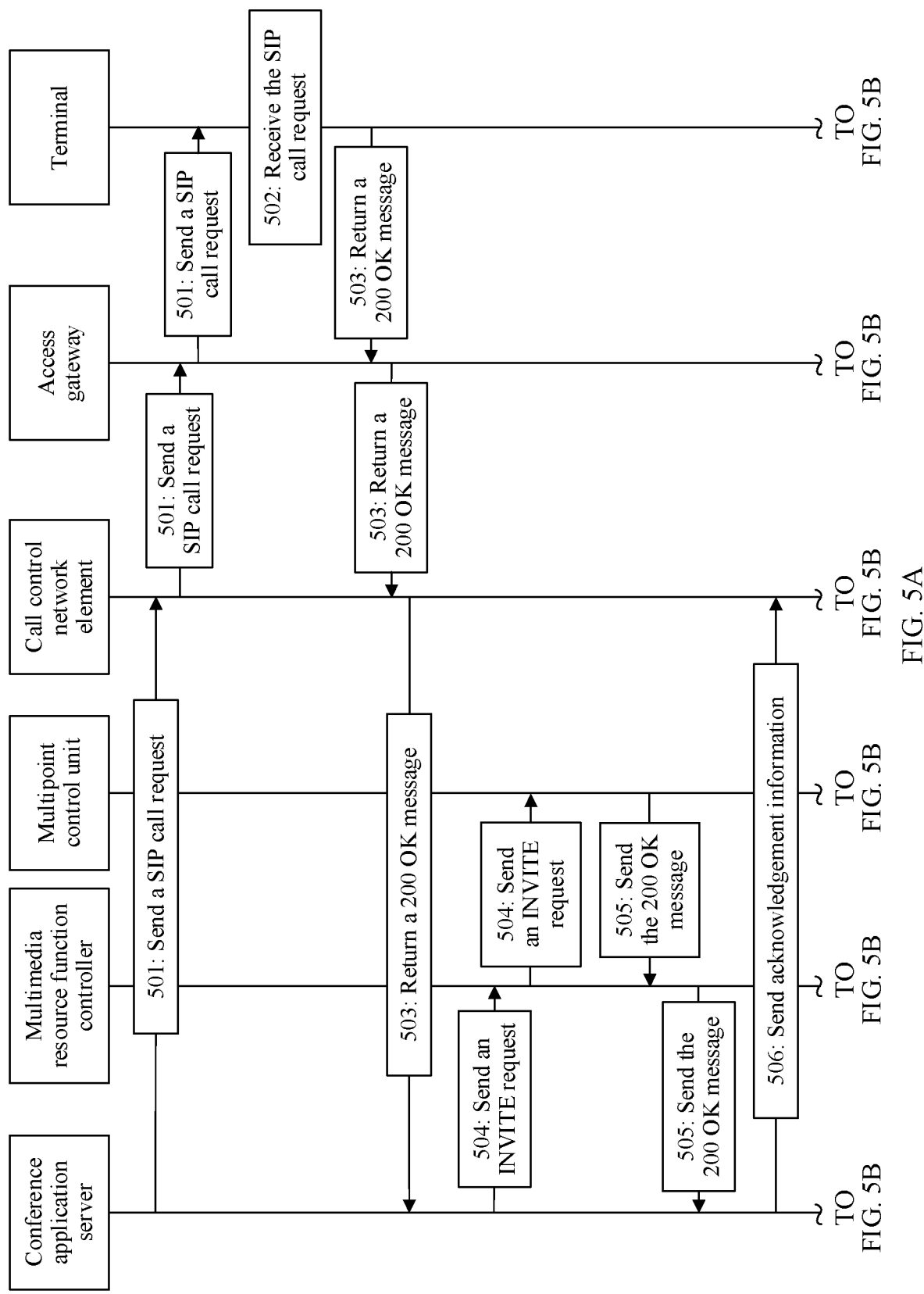
FIG. 5A, FIG. 5B, and FIG. 5C are a flowchart of steps of another embodiment of a video adaptation method according to the present disclosure.
Figure 5B:
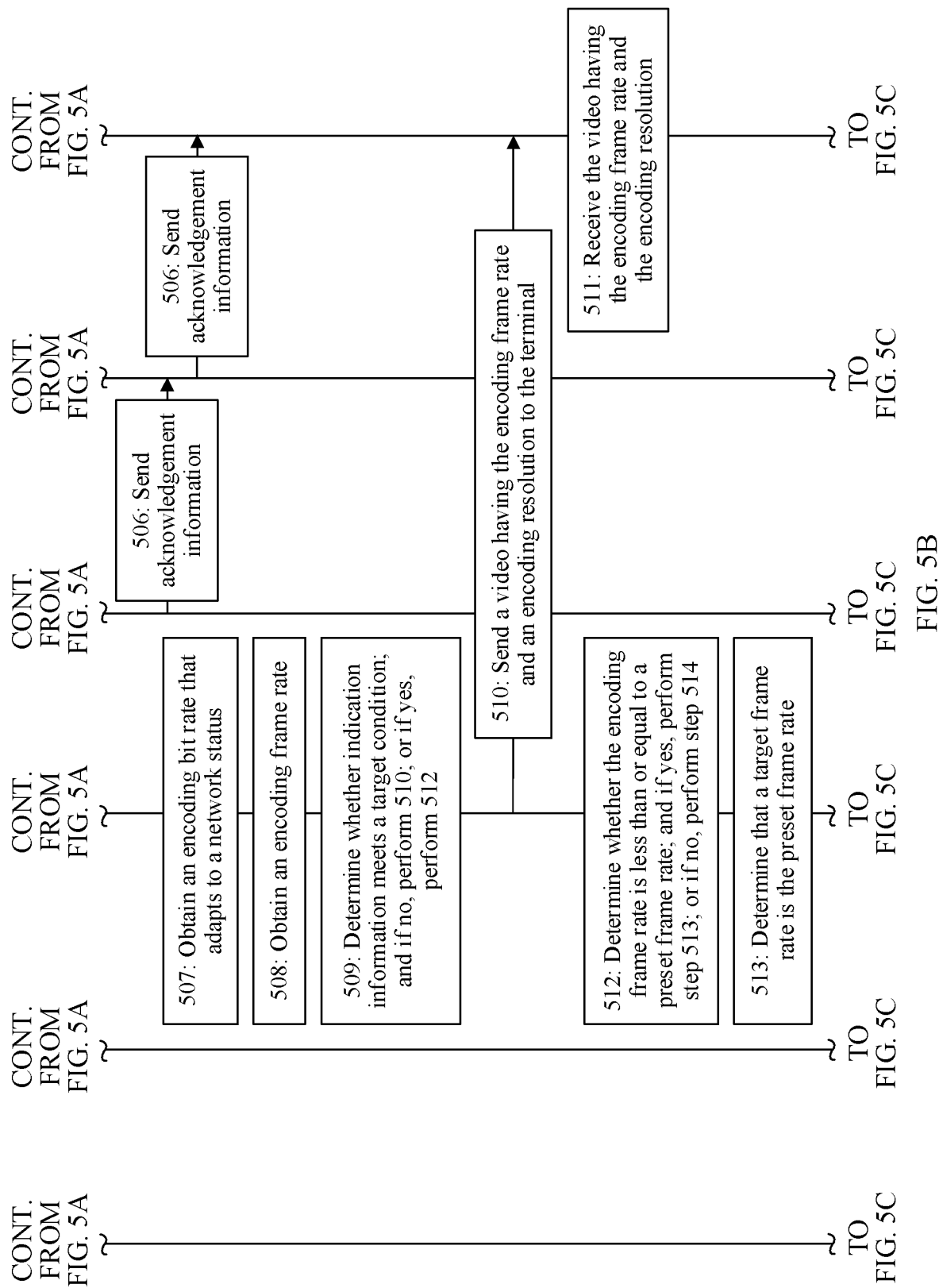
Figure 5C:
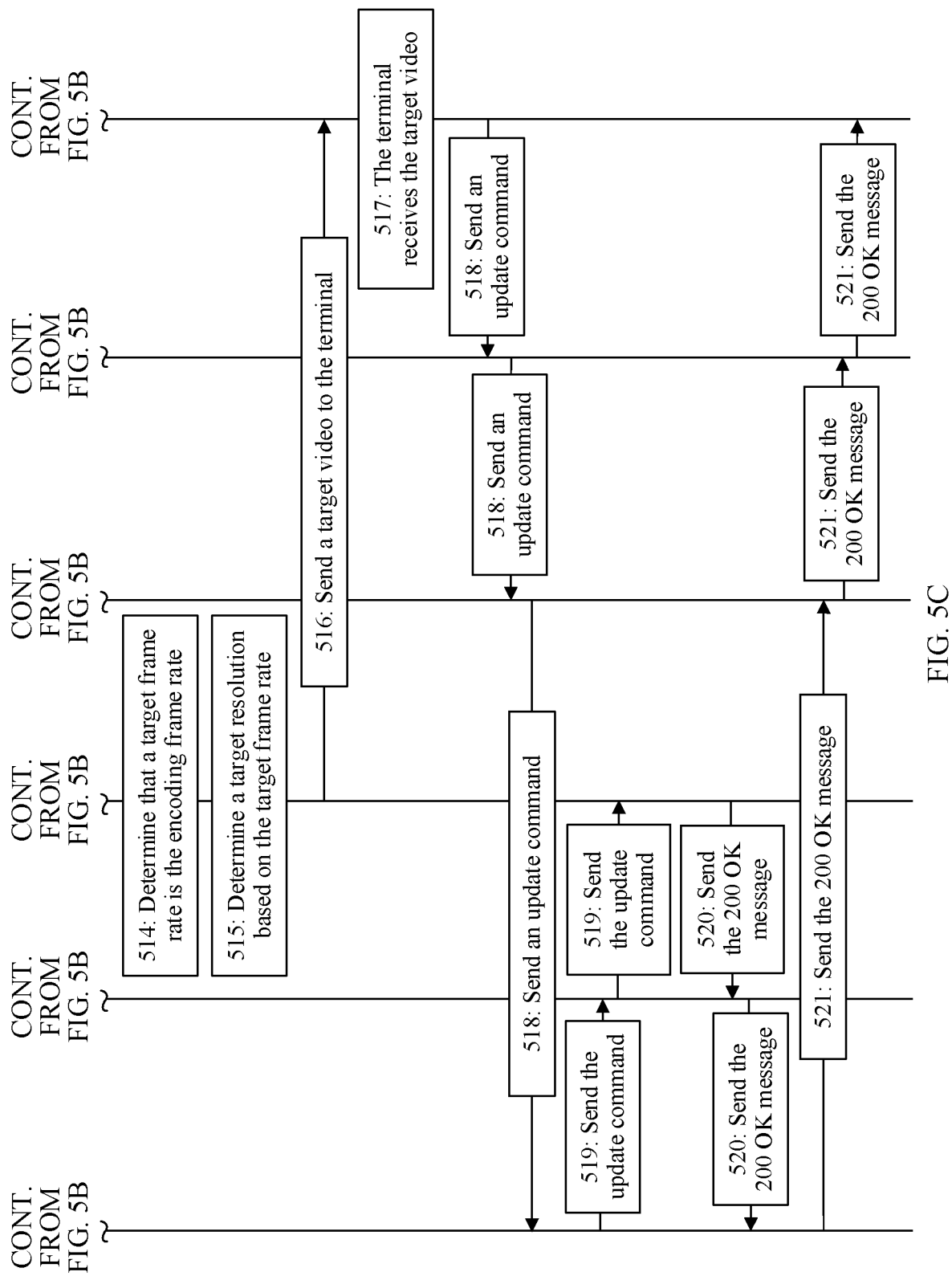

Based on the video network structure applied to the multipoint video conference scenario in FIG. 4, the following describes an example of a specific execution procedure of the video adaptation method with reference to FIG. 5A, FIG. 5B, and FIG. 5C.

Step 501: The conference application server sends a SIP call request.

The conference application server (Conference AS) may determine a to-be-called terminal based on a terminal number entered by a calling user through the conference terminal, and the conference AS generates the SIP call request (INVITE) for calling the terminal. The SIP call request is used to request the terminal having the terminal number to join a SIP session initiated by the conference AS.

Specifically, a path on which the conference AS sends the generated SIP call request to the terminal may be as follows: The conference AS sends the generated SIP call request to the call control network element, the call control network element forwards the received SIP call request to the access gateway, and the access gateway forwards the received SIP call request to the terminal.

Step 502: The terminal receives the SIP call request.

The terminal determines, based on the received SIP call request, that the terminal is invited to join the SIP session initiated by the conference AS.

Step 503: The terminal returns a 200 OK message.

When the terminal determines to join the SIP session initiated by the conference AS, the terminal generates the 200 OK message. The 200 OK message is used to indicate that the terminal agrees to join the SIP session initiated by the conference AS.

In this embodiment, the terminal may add a session description protocol (SDP) offer (offer) message to the 200 OK message, and the SDP offer includes an IP address, a port, and the like used by the terminal to receive a video.

The terminal sends the generated 200 OK message to the conference AS. An example path on which the terminal sends the 200 OK message to the conference AS may be as follows: The terminal sends the 200 OK message to the access gateway, the access gateway forwards the received 200 OK message to the call control network element, and the call control network element forwards the 200 OK message to the conference AS.

In this embodiment, the terminal may configure indication information in the SDP offer. The indication information in this application scenario may be parameters used to indicate different image super-resolution capabilities. For specific descriptions of the indication information, refer to Table 5.

TABLE 5

| Parameter name | Parameter description | Value |
| --- | --- | --- |
| Multiple_flag | Whether the terminal has an image super-resolution capability and an image super-resolution multiplier | 0: The image super-resolution capability is not supported.<br>N: The image super-resolution capability is supported and the multiplier is N. |
| Open_flag | Whether the terminal enables an image super-resolution capability | True: enabled<br>False: disabled |

It can be learned that, if the terminal indicates to the conference AS that the terminal does not have the image super-resolution capability, the parameter Multiple_flag included in the indication information is 0; or if the terminal indicates to the conference AS that the terminal has enabled the image super-resolution capability and the image super-resolution multiplier is 2, the parameter Open_flag included in the indication information is True and the parameter Multiple_flag included in the indication information is 2; or if the terminal indicates to the conference AS that the terminal supports the image super-resolution capability and the multiplier is 2, the parameter Multiple_flag included in the indication information is 2.

Step 504: The conference application server sends the INVITE request to the multipoint control unit.

The INVITE request in this embodiment includes the SDP offer, and the INVITE request is used to invite the multipoint control unit to join the SIP session initiated by the conference application server.

Optionally, a path on which the conference application server sends the INVITE request to the multipoint control unit may be as follows: The conference application server sends the INVITE request to the multimedia resource function controller, and the multimedia resource function controller forwards the received INVITE request to the multipoint control unit. Optionally, the conference application server may separately send the INVITE request to the multipoint control unit and the multimedia resource function controller.

Step 505: The multipoint control unit sends the 200 OK message to the conference application server.

When the multipoint control unit determines to join the SIP session initiated by the conference application server, the multipoint control unit sends the 200 OK message to the conference application server.

Optionally, an example path on which the multipoint control unit sends the 200 OK message to the conference application server may be as follows: The multipoint control unit sends the 200 OK message to the multimedia resource function controller, and the multimedia resource function controller may forward the received 200 OK message to the conference application server.

Step 506: The conference application server sends acknowledgement information.

In this embodiment, after the conference application server determines that the 200 OK message is received, the conference application server sends the acknowledgement (ACK) information to the terminal.

For a path on which the conference AS sends the acknowledgement information to the terminal, refer to the path on which the conference AS sends the SIP call request to the terminal in step 501, and details are not described in this step again.

In this embodiment, step 501 to step 506 are a media negotiation process between the conference application server and the terminal. By performing step 501 to step 506, a connection between the conference application server and the terminal is established to perform media communication.

Step 507: The multipoint control unit obtains an encoding bit rate that matches a network status.

For a specific execution process of step 507 in this embodiment, refer to that of step 203 in FIG. 2A and FIG. 2B, and the specific execution process is not described in this embodiment again.

In this application scenario, the following example is used for description: If the multipoint control unit can detect a current network status in real time, and if it is detected that the current network status changes, the multipoint control unit obtains an encoding bit rate that matches the current network status.

Step 508: The multipoint control unit obtains an encoding frame rate based on the encoding bit rate.

Step 509: The multipoint control unit determines whether the indication information meets a target condition; and if the indication information does not meet the target condition, performs step 510; or if the indication information meets the target condition, performs step 512.

Step 510: The multipoint control unit sends a video having the encoding frame rate and an encoding resolution to the terminal.

Step 511: The terminal receives the video having the encoding frame rate and the encoding resolution.

Step 512: The multipoint control unit determines whether the encoding frame rate is less than or equal to a preset frame rate; and if the encoding frame rate is less than or equal to the preset frame rate, performs step 513; or if the encoding frame rate is not less than or equal to the preset frame rate, performs step 514.

Step 513: The multipoint control unit determines that a target frame rate is the preset frame rate.

Step 514: The multipoint control unit determines that a target frame rate is the encoding frame rate.

Step 515: The multipoint control unit determines the target resolution based on the target frame rate.

Step 516: The multipoint control unit sends a target video to the terminal.

Step 517: The terminal receives the target video.

For a specific execution process of step 508 to step 517 in this application scenario, refer to that of step 204 to step 213 in FIG. 2A and FIG. 2B, and the specific execution process is not described in this application scenario again.

Step 518: The terminal sends an update command to the conference application server.

In this application scenario, the terminal may determine whether the image super-resolution capability is changed; and if the image super-resolution capability is changed, the terminal sends an update command to the conference application server. Optionally, that the image super-resolution capability is changed may mean that the image super-resolution capability of the terminal is changed from an enabled state to a disabled state. Optionally, that the image super-resolution capability is changed may mean that the image super-resolution capability of the terminal is changed from a disabled state to an enabled state. Optionally, that the image super-resolution capability is changed may mean that the image super-resolution multiplier supported by the terminal is changed.

For example, the terminal may determine, based on central processing unit (CPU) utilization of the terminal, whether to enable the image super-resolution capability. For example, in the foregoing media negotiation process, the terminal determines that the CPU utilization of the terminal exceeds a preset threshold. In this case, the terminal may disable the image super-resolution capability. In a subsequent running process, the terminal may detect the CPU utilization of the terminal in real time or periodically. When detecting that the CPU utilization of the terminal is less than the preset threshold, the terminal automatically enables the image super-resolution capability, the terminal determines that the image super-resolution capability of the terminal is changed, and the terminal sends the update command to the conference application server. The terminal may further send the image super-resolution multiplier supported by the terminal to the conference application server by using the update command. The image super-resolution multiplier supported by the terminal may be a preset fixed value, or the image super-resolution multiplier supported by the terminal may be in an inverse correlation with the CPU utilization of the terminal. This is not specifically limited in this application scenario.

For another example, the terminal may determine, based on memory utilization of the terminal, whether to enable the image super-resolution capability. For example, in the foregoing media negotiation process, the terminal determines that the memory utilization of the terminal exceeds a preset threshold. In this case, the terminal may disable the image super-resolution capability. In a subsequent running process, the terminal may detect the memory utilization of the terminal in real time or periodically. When detecting that the memory utilization of the terminal is less than the preset threshold, the terminal automatically enables the image super-resolution capability, the terminal determines that the image super-resolution capability of the terminal is changed, and the terminal sends the update command to the conference application server. The terminal may further send the image super-resolution multiplier supported by the terminal to the conference application server by using the update command. The image super-resolution multiplier supported by the terminal may be a preset fixed value, or the image super-resolution multiplier supported by the terminal may be in an inverse correlation with the memory utilization of the terminal. This is not specifically limited in this application scenario.

A path on which the terminal sends the update command to the conference application server may be as follows: The terminal sends the update command to the access gateway, the access gateway forwards the received update command message to the call control network element, and the call control network element forwards the received update command message to the conference application server.

In this application scenario, if the update command sent by the terminal is used to indicate that the image super-resolution capability of the terminal is changed from an enabled state to a disabled state, and/or the image super-resolution multiplier supported by the terminal is changed to be less than or equal to 1, the conference application server performs step 507 to step 510; or if the update command sent by the terminal is used to indicate that the image super-resolution capability of the terminal is changed from a disabled state to an enabled state, and/or the image super-resolution multiplier supported by the terminal is changed to be greater than 1, the conference application server performs step 507 and step 508, and step 512 to step 516.

For description of the path on which the terminal sends the update command to the conference application server, refer to the path on which the terminal sends the 200 OK message to the conference application server in step 503, and details are not described in this application scenario again.

Step 519: The conference application server sends the update command to the multipoint control unit.

An example path on which the conference application server sends the update command to the multipoint control unit may be as follows: The conference application server sends the update command to the multimedia resource function controller, and the multimedia resource function controller forwards the received update command to the multipoint control unit. Optionally, the conference application server may separately send the update command to the multipoint control unit and the multimedia resource function controller.

Step 520: The multipoint control unit sends the 200 OK message to the conference application server.

Step 521: The conference application server sends the 200 OK message to the terminal.

In this embodiment, after the conference application server determines that the 200 OK message is received, the conference application server sends the 200 OK message to the terminal.

Specifically, an example path on which the conference application server sends the 200 OK message to the terminal may be as follows: The conference application server sends the generated 200 OK message to the call control network element, the call control network element forwards the received 200 OK message to the access gateway, and the access gateway forwards the received 200 OK message to the terminal.

According to the method in this application scenario, when the multipoint control unit determines that the image super-resolution capability of the terminal is enabled or the image super-resolution capability of the terminal is changed from a disabled state to an enabled state, the multipoint control unit may adjust, based on the image super-resolution capability of the terminal, a frame rate and a resolution of the target video to be sent to the terminal, so that the target frame rate and the target resolution of the target video that are obtained after the adjustment match the image super-resolution capability of the terminal. The multipoint control unit may send the target video to the terminal, and the terminal may display the target video whose definition and smoothness are balanced. Therefore, it is ensured that the terminal displays the high-definition target video, and the smoothness of displaying the target video is also effectively ensured.

Based on the video network structure in the multipoint video conference scenario in FIG. 4, in the application scenario in FIG. 5A, FIG. 5B, and FIG. 5C, the multipoint control unit may adjust the frame rate of the target video by setting the preset frame rate, to implement the video adaptation method. With reference to an application scenario in FIG. 6A, FIG. 6B, and FIG. 6C, the following describes an example of another method in which the multipoint control unit determines the target frame rate and the target resolution based on the indication information.

Step 601: The conference application server sends a SIP call request to the terminal.

Step 602: The terminal receives the SIP call request.

Step 603: The terminal returns a 200 OK message to the conference application server.

Step 604: The conference application server sends the INVITE request to the multipoint control unit.

Step 605: The multipoint control unit sends the 200 OK message to the conference application server.

Step 606: The conference application server sends acknowledgement information to the terminal.

Step 607: The multipoint control unit obtains an encoding bit rate that matches a network status.

For a specific execution process of step 601 to step 607 in this application scenario, refer to that of step 501 to step 507 in FIG. 5A, FIG. 5B, and FIG. 5C, and the specific execution process is not described in this application scenario again.

Step 608: The multipoint control unit determines whether the indication information meets a target condition; and if the indication information does not meet the target condition, performs step 609; or if the indication information meets the target condition, performs step 611.

Step 609: The multipoint control unit obtains an encoding frame rate based on the encoding bit rate.

Step 610: The multipoint control unit sends a video having the encoding frame rate and an encoding resolution to the terminal.

Step 611: The terminal receives the video having the encoding frame rate and the encoding resolution.

Step 612: The multipoint control unit obtains a first correspondence and a second correspondence that correspond to the indication information.

Step 613: The multipoint control unit determines the target resolution.

Step 614: The multipoint control unit determines the target frame rate.

Step 615: The multipoint control unit sends a target video to the terminal.

Step 616: The terminal receives the target video.

Figure 3A:
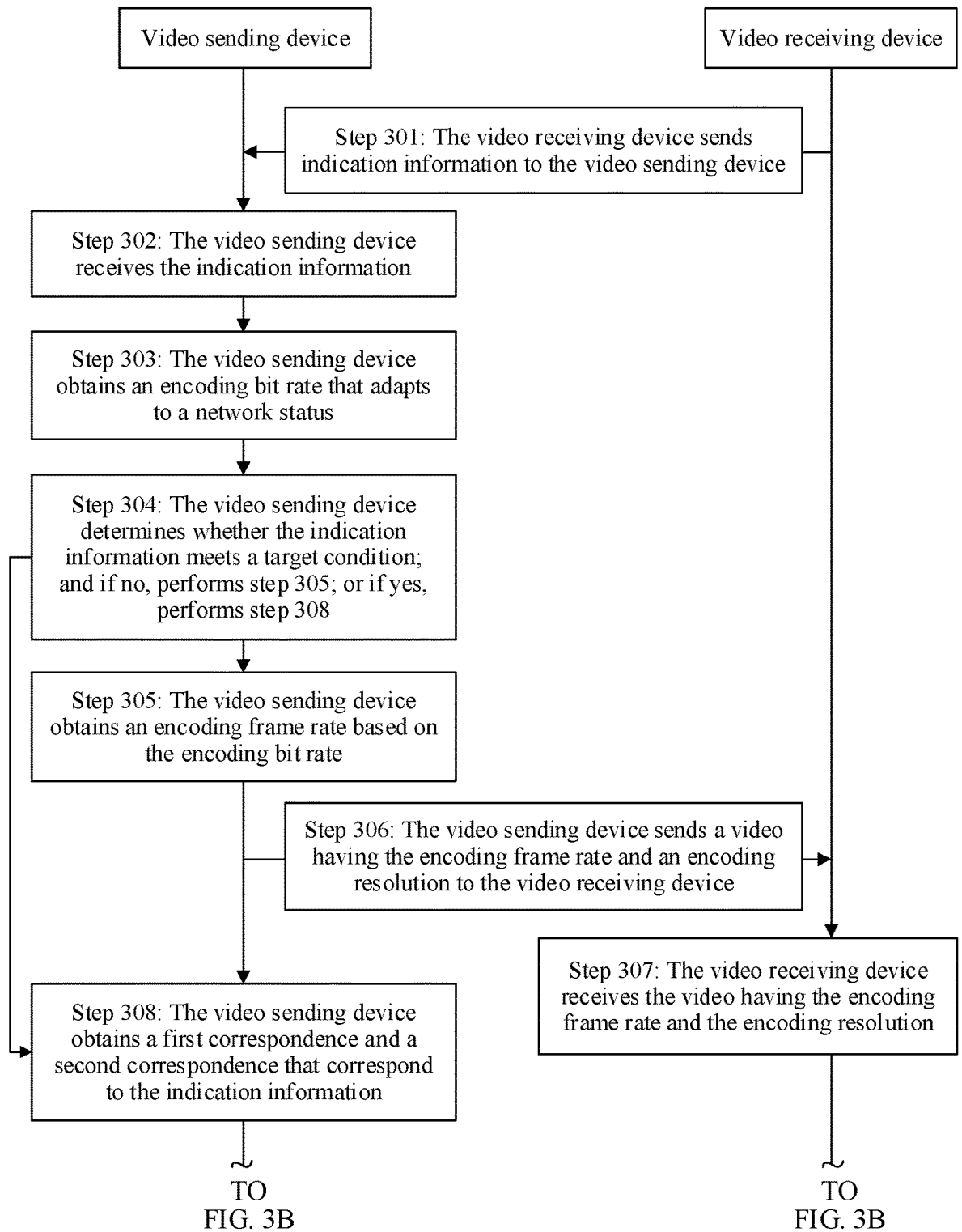
FIG. 3A and FIG. 3B are a flowchart of steps of another embodiment of a video adaptation method according to the present disclosure.
Figure 3B:
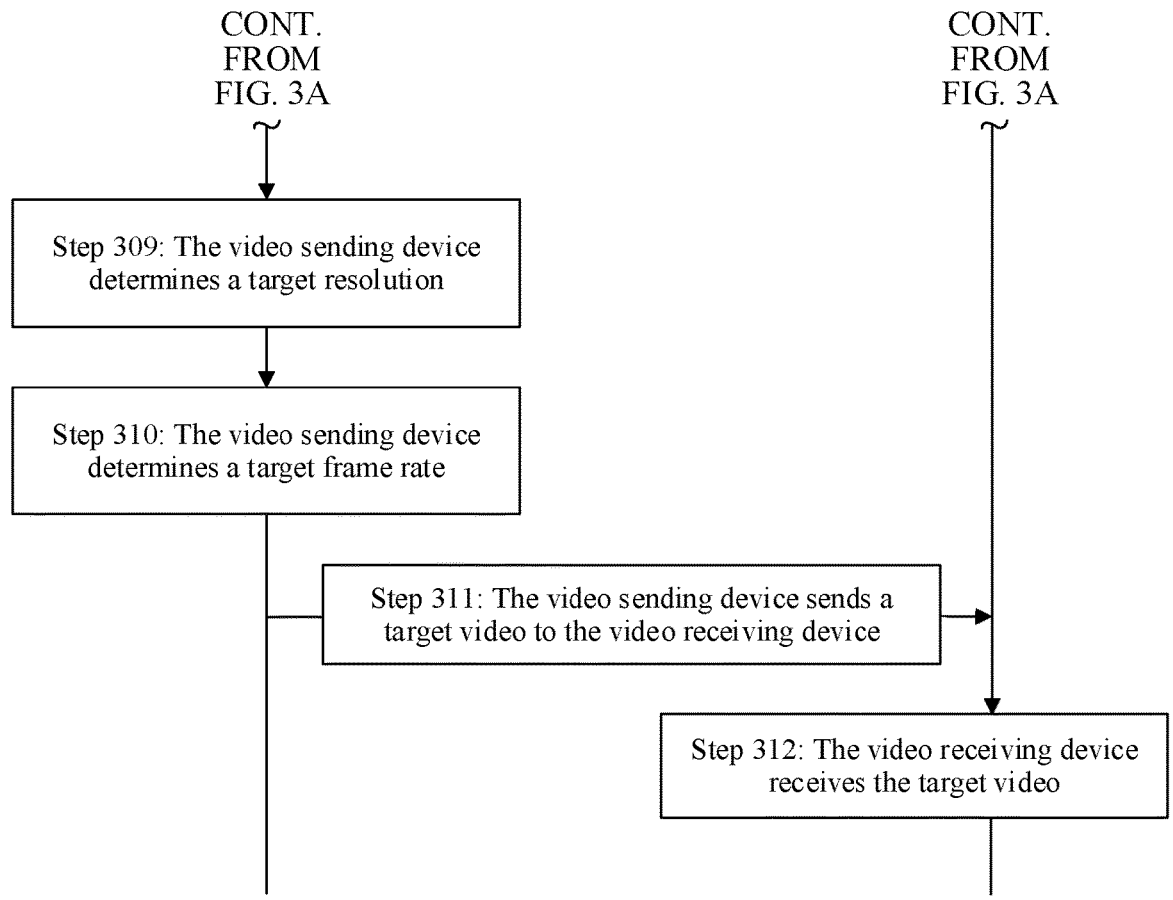

For a specific execution process of step 608 to step 616 in this application scenario, refer to that of step 304 to step 312 in FIG. 3A and FIG. 3B, and the specific execution process is not described in this application scenario again.

Step 617: The terminal sends an update command to the conference application server.

Step 618: The conference application server sends the update command to the multipoint control unit.

Step 619: The multipoint control unit sends the 200 OK message to the conference application server.

Step 620: The conference application server sends the 200 OK message to the terminal.

For a specific execution process of step 617 to step 620 in this application scenario, refer to that of step 518 to step 521 in FIG. 5A, FIG. 5B, and FIG. 5C, and the specific execution process is not described in this application scenario again.

According to the method in this application scenario, when the multipoint control unit determines that an image super-resolution capability of the terminal is enabled, the multipoint control unit may update the stored correspondences, so that the multipoint control unit can determine a larger target frame rate based on a same bit rate. The multipoint control unit adjusts a frame rate and a resolution of the target video to be sent to the terminal, so that the target frame rate and the target resolution of the target video match the image super-resolution capability of the terminal. The multipoint control unit sends the target video to the terminal, and the terminal may display the target video whose definition and smoothness are balanced. Therefore, it is ensured that the terminal displays the high-definition target video, and the smoothness of displaying the target video is also effectively ensured.

To better understand the video adaptation method provided in this application, the following further describes an example of an execution process of the video adaptation method with reference to another specific application scenario.

Figure 7:
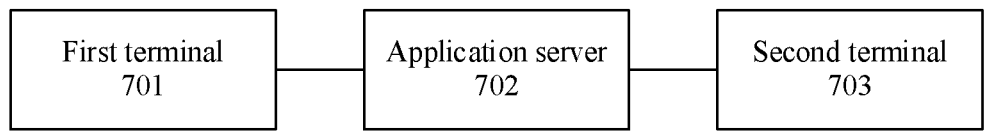
FIG. 7 is an example diagram of a video network structure in a multipoint video session scenario according to the present disclosure.

Referring to an application scenario in FIG. 7, FIG. 7 is an example diagram of a video network structure in a point-to-point session scenario according to the present disclosure.

As shown in FIG. 7, when a video network is applied to the point-to-point session scenario, the video network specifically includes a first terminal 701, an application server (AS) 702, and a second terminal 703.

When the first terminal 701 initiates a call to the second terminal 703 by using the AS 702, the first terminal 701 serves as a video sending device, and the second terminal 703 serves as a video receiving device. When the second terminal 703 initiates a call to the first terminal 701 by using the AS 702, the second terminal 703 serves as a video sending device, and the first terminal 701 serves as a video receiving device.

In this application scenario, an example in which the first terminal 701 and the second terminal 703 perform a real-time video call is used for description. To display a high-definition video in a real-time video call scenario, the following describes a specific execution procedure of this application scenario with reference to FIG. 8A and FIG. 8B. It should be noted that the following method may also be applied to a non-real-time video call scenario. For example, the first terminal and the second terminal may exchange a recorded video. This is not specifically limited.

Step 801: The first terminal sends a SIP call request to the AS.

When the first terminal determines that the first terminal needs to perform a real-time video call with the second terminal, the first terminal may send the SIP call request to the AS. The SIP call request includes a number of the second terminal.

In this application scenario, the SIP call request may further include information such as an IP address and a port used by the first terminal to receive a video, so that the second terminal can send the video to the first terminal based on the SIP call request.

The SIP call request further includes first indication information, and the first indication information is used to indicate an image super-resolution capability of the first terminal. For specific description of the first indication information, refer to the description of the indication information in the application scenario in FIG. 5A, FIG. 5B, and FIG. 5C, and details are not described again.

Step 802: The AS forwards the SIP call request to the second terminal.

Step 803: The second terminal returns a 200 OK message to the AS.

When the second terminal determines to perform the real-time video call with the first terminal, the second terminal generates the 200 OK message. The 200 OK message is used to indicate that the second terminal agrees to join the real-time video call initiated by the first terminal.

In this embodiment, the second terminal may add an SDP offer message to the 200 OK message, and the SDP offer includes an IP address, a port, and the like used by the second terminal to receive a video, so that the first terminal can send the video to the second terminal according to an indication of the SDP offer message.

The SDP offer message in this application scenario may further include second indication information, and the second indication information is used to indicate an image super-resolution capability of the second terminal. For specific description of the second indication information, refer to the description of the indication information in the application scenario in FIG. 5A, FIG. 5B, and FIG. 5C, and details are not described again.

Step 804: The AS forwards the 200 OK message to the first terminal.

Step 805: The first terminal sends acknowledgement information to the AS.

In this application scenario, after the first terminal determines that the 200 OK message is received, the first terminal sends the acknowledgement (ACK) information to the AS.

Step 806: The AS forwards the acknowledgement information to the second terminal.

In this application scenario, step 801 to step 806 are a media negotiation process. By performing step 801 to step 806, a connection between the first terminal and the second terminal is established to perform a real-time video call.

The following steps describe an example of a process in which the first terminal sends a video to the second terminal.

Step 807: The first terminal obtains an encoding bit rate that matches a network status.

For a specific execution process of step 807 in this embodiment, refer to that of step 203 in FIG. 2A and FIG. 2B, and the specific execution process is not described in this embodiment again.

Optionally, the first terminal may detect a current network status in real time, and if it is detected that the current network status changes, the first terminal obtains an encoding bit rate that matches the current network status.

Optionally, the AS may detect a current network status in real time, and if it is detected that the current network status changes, the AS notifies the first terminal of a case in which the network status changes, and the first terminal obtains an encoding bit rate that matches the current network status.

Step 808: The first terminal obtains an encoding frame rate based on the encoding bit rate.

Step 809: The first terminal determines whether the second indication information meets a target condition; and if the second indication information does not meet the target condition, performs step 810; or if the second indication information meets the target condition, performs step 812.

Step 810: The first terminal sends a video having the encoding frame rate and an encoding resolution to the second terminal.

Step 811: The second terminal receives the video having the encoding frame rate and the encoding resolution.

Step 812: The first terminal determines whether the encoding frame rate is less than or equal to a preset frame rate; and if the encoding frame rate is less than or equal to the preset frame rate, performs step 813; or if the encoding frame rate is not less than or equal to the preset frame rate, performs step 814.

Step 813: The first terminal determines that a target frame rate is the preset frame rate.

Step 814: The first terminal determines that a target frame rate is the encoding frame rate.

Step 815: The first terminal determines a target resolution based on the target frame rate.

Step 816: The first terminal sends a target video to the second terminal.

Step 817: The second terminal receives the target video.

For a specific execution process of step 808 to step 817 in this application scenario, refer to that of step 508 to step 517 in FIG. 5A, FIG. 5B, and FIG. 5C, and the specific execution process is not described in this application scenario again.

Step 818: The second terminal sends an update command to the AS.

In this application scenario, for description of sending the update command by the second terminal, refer to the description of sending the update command by the terminal in step 518 in FIG. 5A, FIG. 5B, and FIG. 5C, and details are not described in this application scenario again.

Step 819: The AS forwards the update command to the first terminal.

In this application scenario, if the update command sent by the second terminal is used to indicate that the image super-resolution capability of the second terminal is changed from an enabled state to a disabled state, and/or an image super-resolution multiplier supported by the terminal is changed to be less than or equal to 1, the first terminal performs step 807 to step 810; or if the update command sent by the second terminal is used to indicate that the image super-resolution capability of the second terminal is changed from a disabled state to an enabled state, and/or an image super-resolution multiplier supported by the second terminal is changed to be greater than 1, the first terminal performs step 807 and step 808, and step 812 to step 816.

Step 820: The first terminal sends the 200 OK message to the AS.

Step 821: The AS sends the 200 OK message to the second terminal.

For a specific execution process of step 820 and step 821 in this application scenario, refer to that of step 520 and step 521 in FIG. 5A, FIG. 5B, and FIG. 5C, and details are not described in this application scenario again.

For a specific process in which the second terminal sends a video to the first terminal, refer to the foregoing specific process in which the first terminal sends a video to the second terminal, and details are not described in this application scenario again.

According to the method in this application scenario, when the first terminal determines that the image super-resolution capability of the second terminal is enabled or the image super-resolution capability of the second terminal is changed from a disabled state to an enabled state, the first terminal may adjust, based on the image super-resolution capability of the second terminal, a frame rate and a resolution of the target video to be sent to the second terminal, so that the target frame rate and the target resolution of the target video that are obtained after the adjustment match the image super-resolution capability of the second terminal. The first terminal may send the target video to the second terminal, and the second terminal may display the target video whose definition and smoothness are balanced. Therefore, it is ensured that the second terminal displays the high-definition target video, and the smoothness of displaying the target video is also effectively ensured.

Figure 8A:
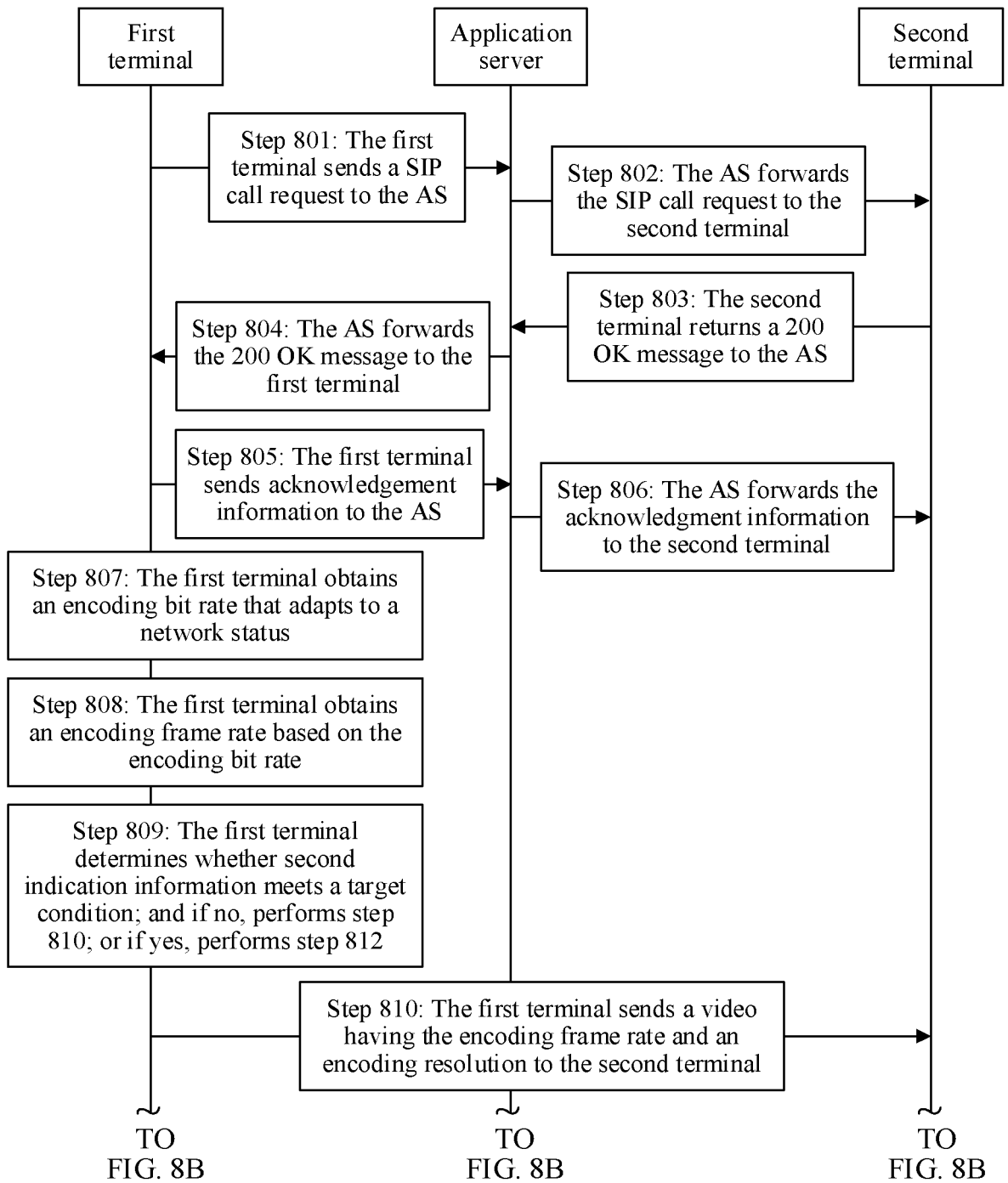
FIG. 8A and FIG. 8B are a flowchart of steps of another embodiment of a video adaptation method according to the present disclosure.
Figure 8B:
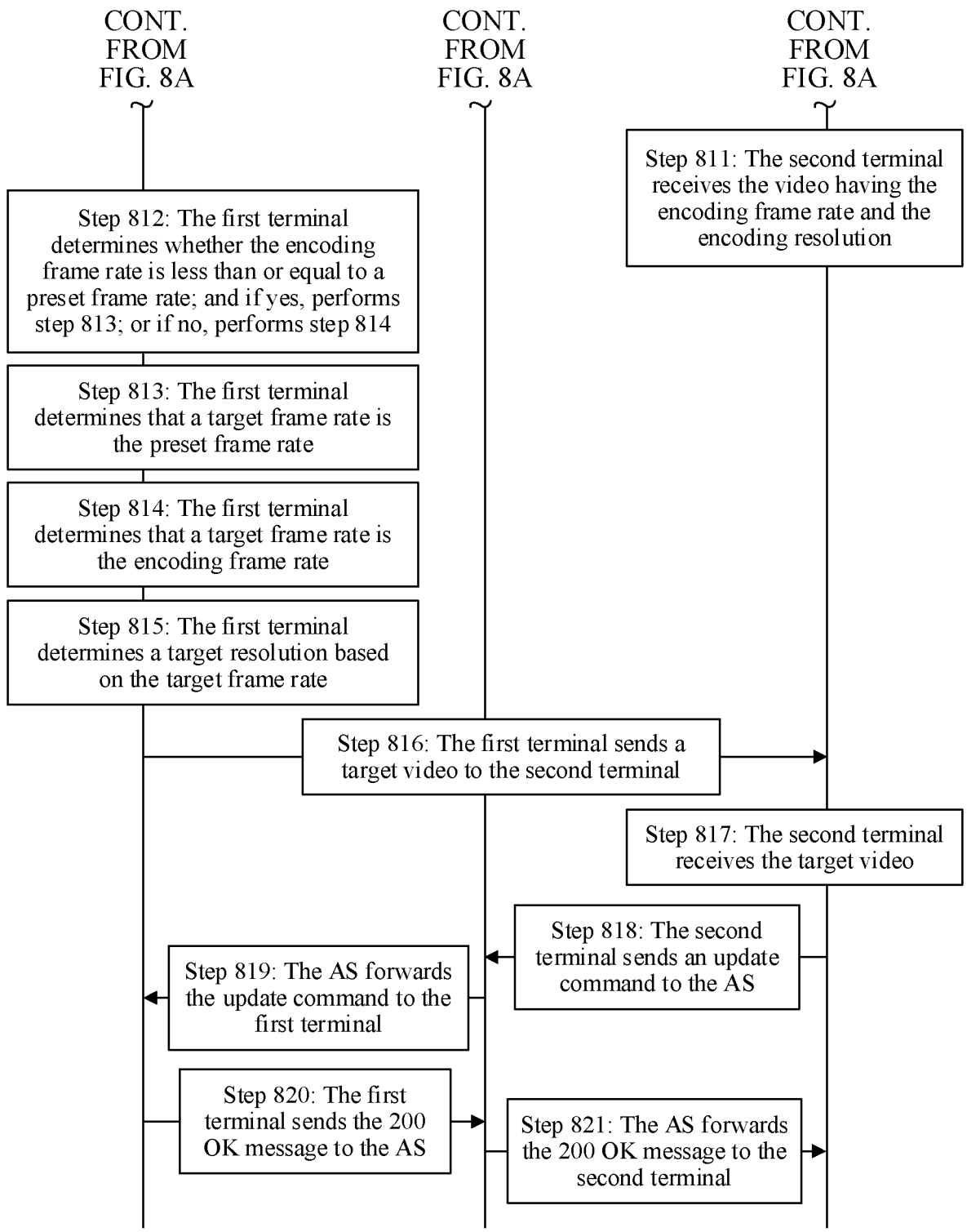
Figure 9A:
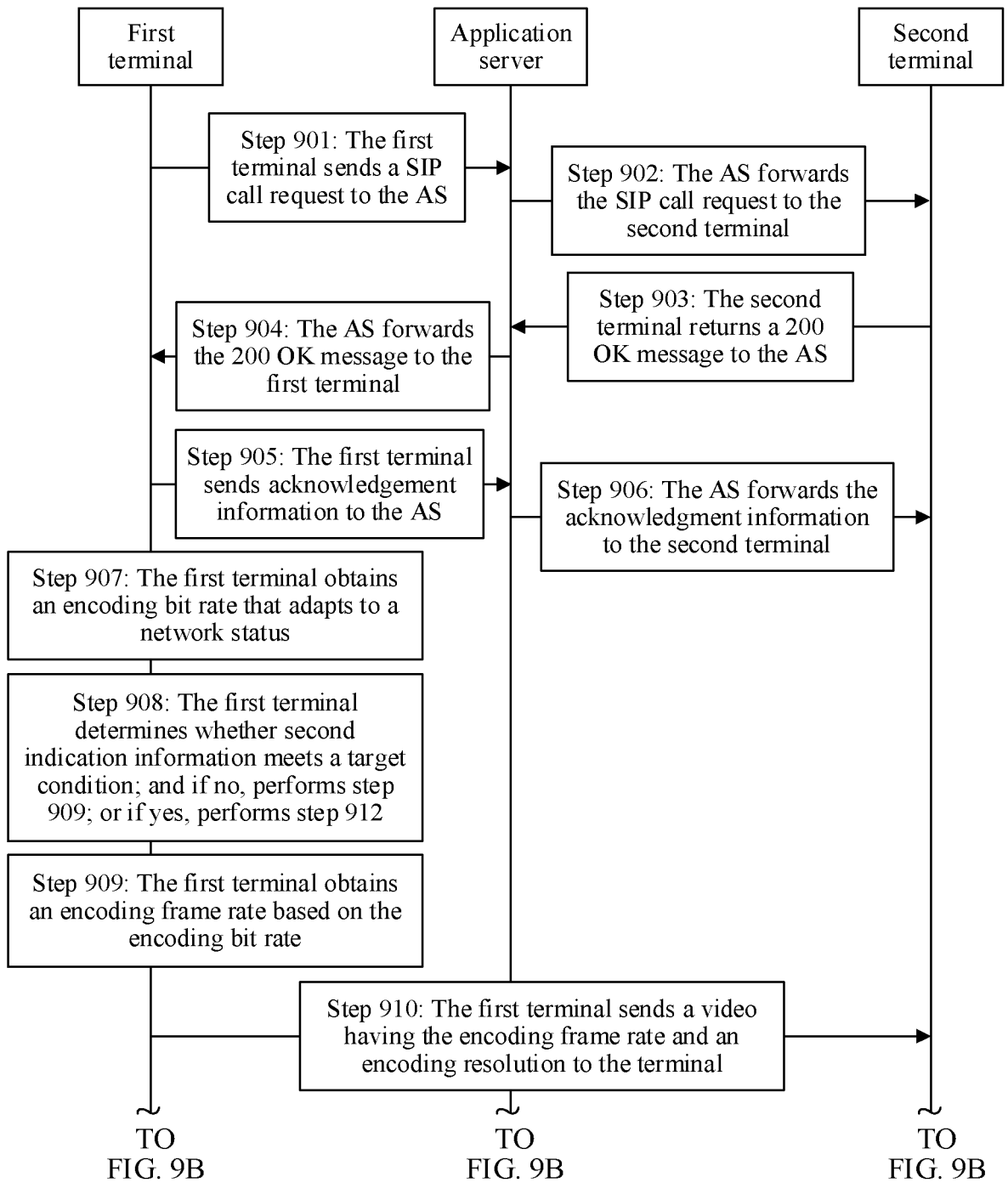
FIG. 9A and FIG. 9B are a flowchart of steps of another embodiment of a video adaptation method according to the present disclosure.
Figure 9B:
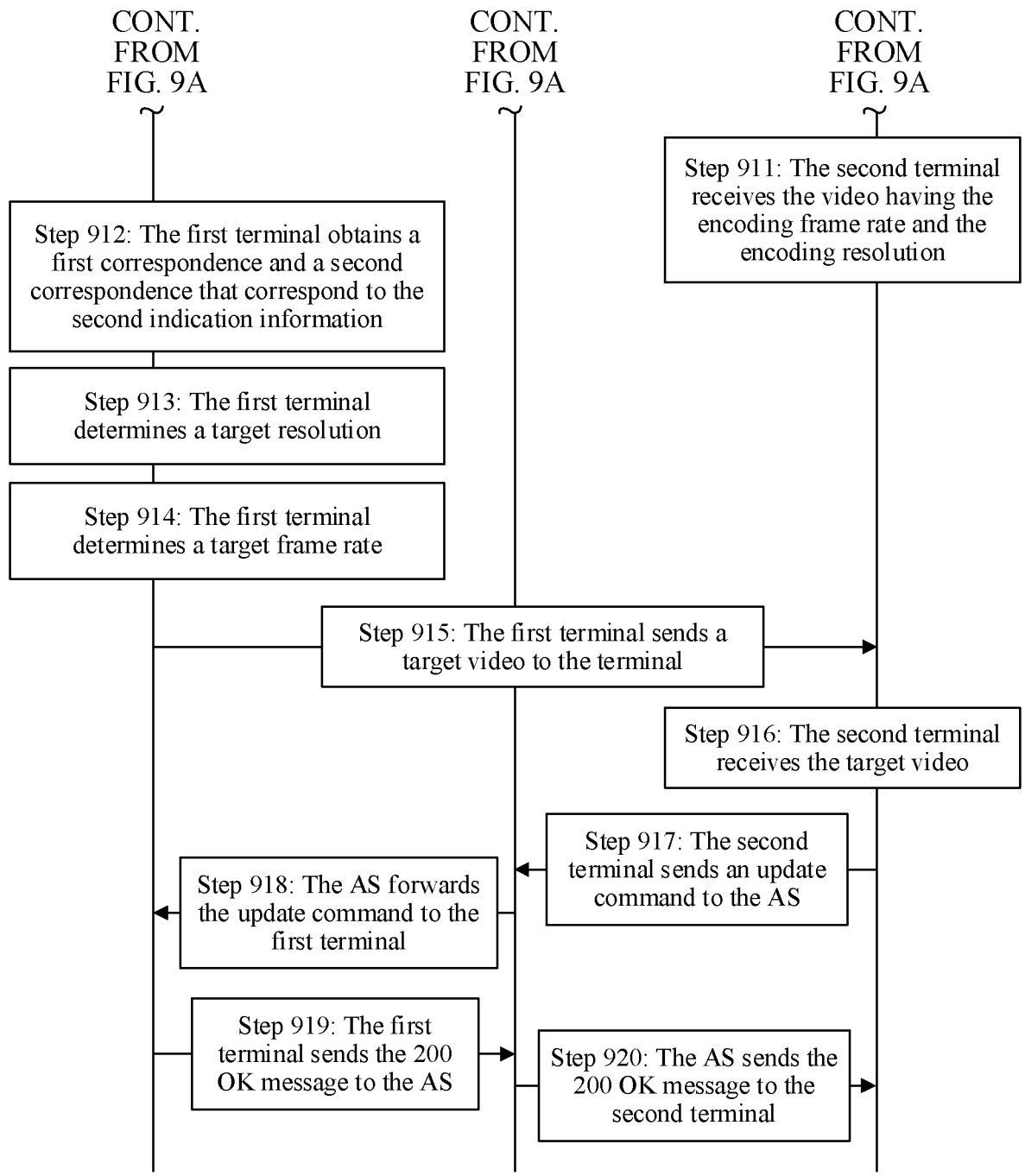

Based on the network structure of the point-to-point real-time video call in FIG. 7, in the application scenario in FIG. 8A and FIG. 8B, the first terminal may adjust the frame rate of the target video by setting the preset frame rate, to implement the video adaptation method. With reference to an application scenario in FIG. 9A and FIG. 9B, the following describes an example of another method in which the first terminal determines the target frame rate and the target resolution based on the indication information.

Step 901: The first terminal sends a SIP call request to the AS.

Step 902: The AS forwards the SIP call request to the second terminal.

Step 903: The second terminal returns a 200 OK message to the AS.

Step 904: The AS forwards the 200 OK message to the first terminal.

Step 905: The first terminal sends acknowledgement information to the AS.

Step 906: The AS forwards the acknowledgement information to the second terminal.

Step 907: The first terminal obtains an encoding bit rate that matches a network status.

For a specific execution process of step 901 to step 907 in this application scenario, refer to that of step 801 to step 807 in FIG. 8A and FIG. 8B, and the specific execution process is not described in this application scenario again.

Step 908: The first terminal determines whether the second indication information meets a target condition; and if the second indication information does not meet the target condition, performs step 909; or if the second indication information meets the target condition, performs step 912.

Step 909: The first terminal obtains an encoding frame rate based on the encoding bit rate.

Step 910: The first terminal sends a video having the encoding frame rate and an encoding resolution to the second terminal.

Step 911: The second terminal receives the video having the encoding frame rate and the encoding resolution.

Step 912: The first terminal obtains a first correspondence and a second correspondence that correspond to the second indication information.

Step 913: The first terminal determines the target resolution.

Step 914: The first terminal determines the target frame rate.

Step 915: The first terminal sends a target video to the terminal.

Step 916: The second terminal receives the target video.

Figure 6A:
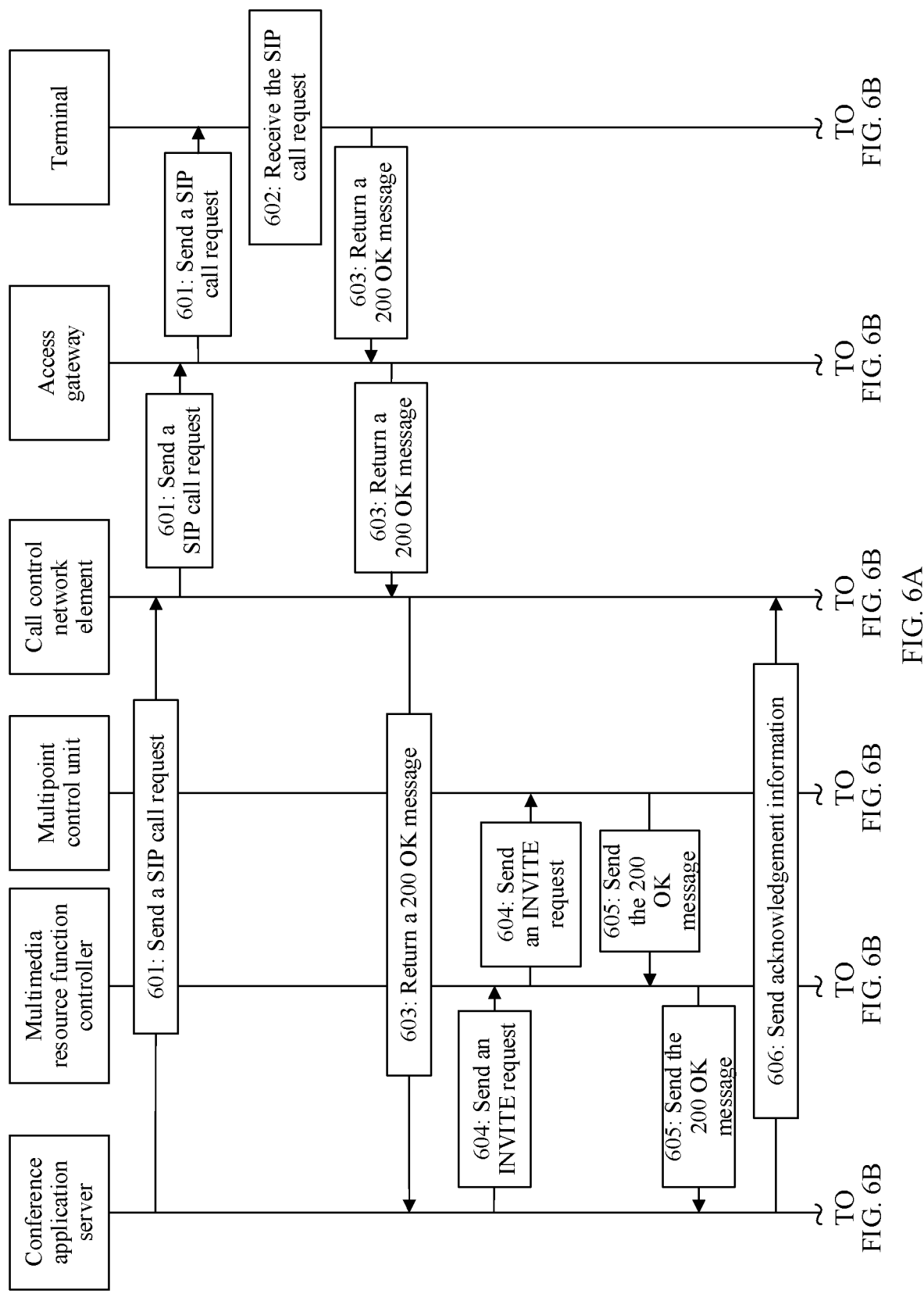
FIG. 6A, FIG. 6B, and FIG. 6C are a flowchart of steps of another embodiment of a video adaptation method according to the present disclosure.
Figure 6B:
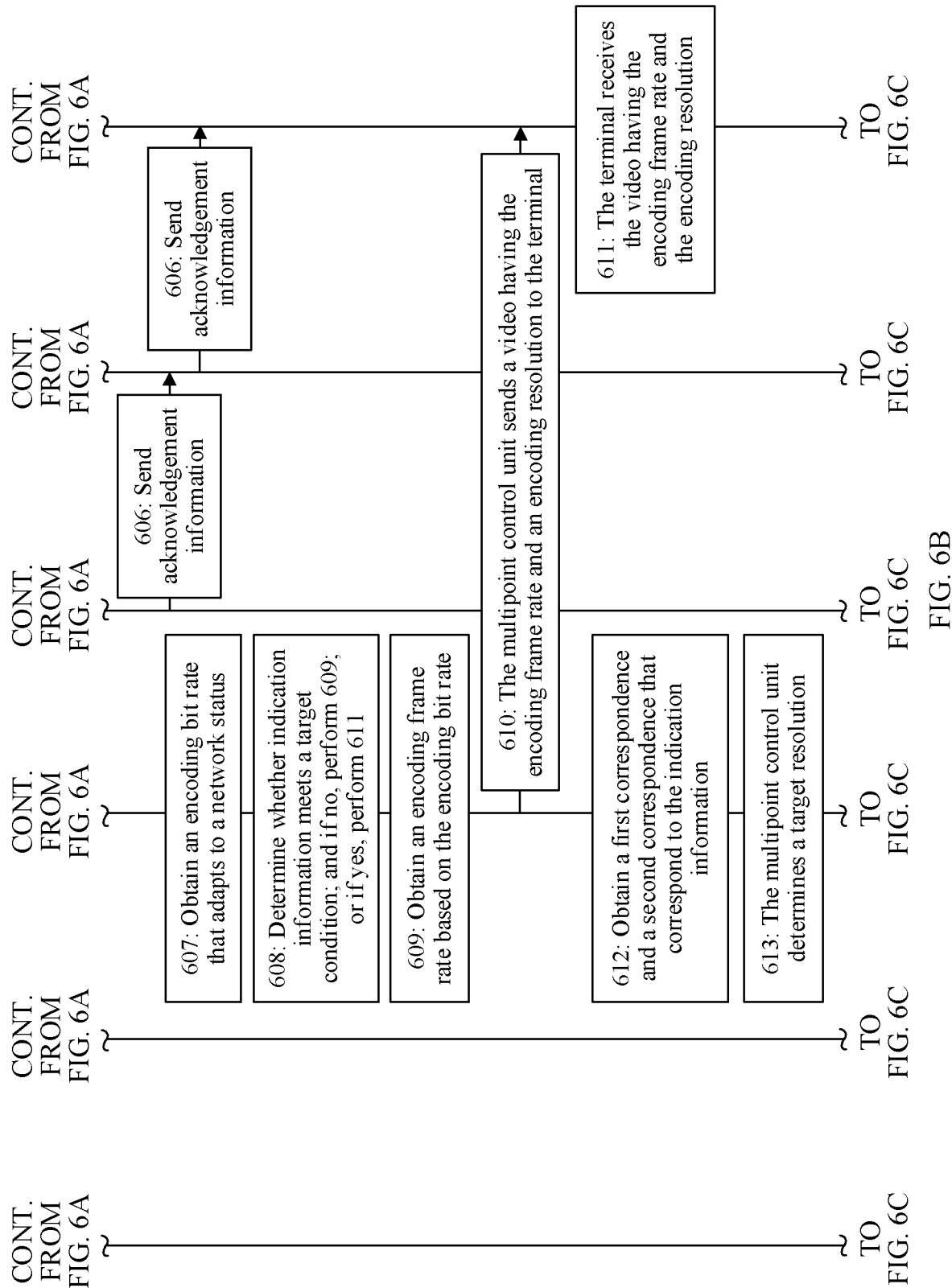
Figure 6C:
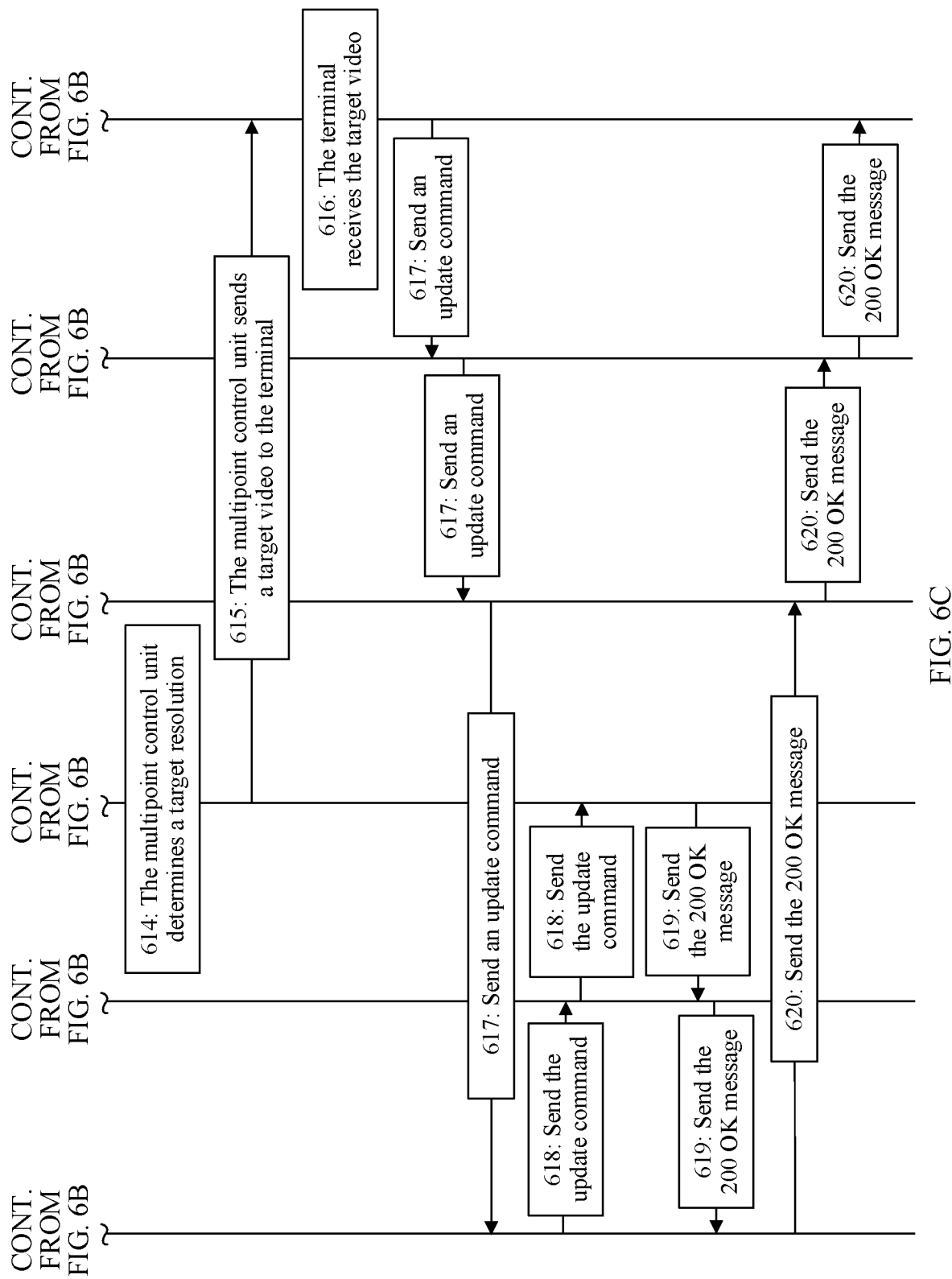

For a specific execution process of step 908 to step 916 in this application scenario, refer to that of step 604 to step 612 in FIG. 6A, FIG. 6B, and FIG. 6C, and the specific execution process is not described in this application scenario again.

Step 917: The second terminal sends an update command to the AS.

Step 918: The AS sends the update command to the first terminal.

Step 919: The first terminal sends the 200 OK message to the AS.

Step 920: The AS sends the 200 OK message to the second terminal.

For a specific execution process of step 917 to step 920 in this application scenario, refer to that of step 518 to step 521 in FIG. 5A, FIG. 5B, and FIG. 5C, and the specific execution process is not described in this application scenario again.

According to the method in this application scenario, when the first terminal determines that an image super-resolution capability of the second terminal is enabled, the first terminal may update the stored correspondences, so that the first terminal can determine a larger target frame rate based on a same bit rate. The first terminal adjusts a frame rate and a resolution of the target video to be sent to the second terminal, so that the target frame rate and the target resolution of the target video match the image super-resolution capability of the second terminal. The first terminal sends the target video to the second terminal, and the second terminal may display the target video whose definition and smoothness are balanced. Therefore, it is ensured that the terminal displays the high-definition target video, and the smoothness of displaying the target video is also effectively ensured.

Figure 10:
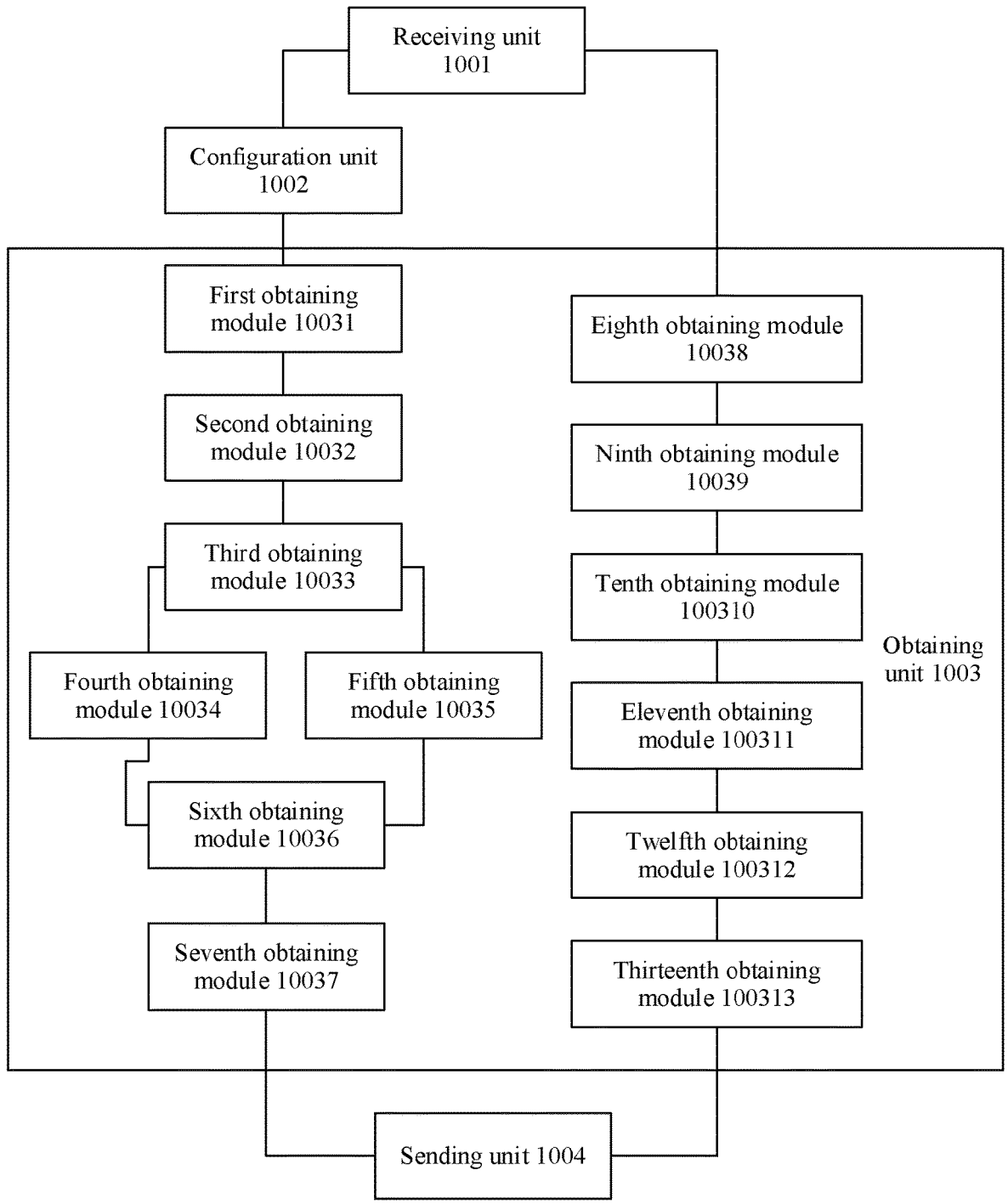
FIG. 10 is a schematic structural diagram of an embodiment of a video sending device according to the present disclosure.

The following describes an example of a specific structure of a video sending device provided in this application with reference to FIG. 10. The video sending device is configured to perform a video adaptation method. For a specific execution process of the video adaptation method, refer to the foregoing embodiment.

The video sending device includes a receiving unit 1001, an obtaining unit 1003, and a sending unit 1004.

The receiving unit 1001 is configured to receive indication information sent by a video receiving device, where the indication information is used to indicate an image super-resolution capability of the video receiving device.

Optionally, the video sending device further includes a configuration unit 1002. If the indication information is used to indicate an image super-resolution multiplier supported by the video receiving device, the configuration unit 1002 is configured to set a preset frame rate based on the indication information, where a value of the preset frame rate corresponds to the image super-resolution multiplier supported by the video receiving device.

Optionally, there is a positive correlation between the value of the preset frame rate and the image super-resolution multiplier supported by the video receiving device.

The obtaining unit 1003 is configured to: if the indication information received by the receiving unit 1001 is used to indicate that the image super-resolution capability of the video receiving device is enabled, obtain a video having a target frame rate and a target resolution that correspond to the indication information.

Optionally, if the indication information is further used to indicate the image super-resolution multiplier supported by the video receiving device, the obtaining unit 1003 is further configured to: when it is determined that the multiplier indicated by the indication information is greater than 1, perform the step of obtaining a video having a target frame rate and a target resolution that correspond to the indication information.

Optionally, the obtaining unit 1003 includes:

a first obtaining module 10031, configured to obtain an encoding bit rate that matches a network status;

a second obtaining module 10032, configured to obtain an encoding frame rate corresponding to the encoding bit rate;

a third obtaining module 10033, configured to obtain the preset frame rate corresponding to the indication information;

a fourth obtaining module 10034, configured to: if the encoding frame rate is less than the preset frame rate, determine that the target frame rate is the preset frame rate;

a fifth obtaining module 10035, configured to: if the encoding frame rate is greater than or equal to the preset frame rate, determine that the target frame rate is the encoding frame rate;

a sixth obtaining module 10036, configured to determine the target resolution based on the target frame rate; and a seventh obtaining module 10037, configured to obtain the video having the target frame rate and the target resolution.

Specifically, the sixth obtaining module 10036 is specifically configured to: if the target frame rate is the preset frame rate, determine an average single-frame size based on the encoding bit rate and the target frame rate, where the average single-frame size is a quantity of bytes included in each video frame; and determine that a resolution corresponding to the average single-frame size is the target resolution.

Optionally, the obtaining unit 1003 includes:

an eighth obtaining module 10038, configured to obtain a first correspondence and a second correspondence that correspond to the indication information, where the first correspondence includes correspondences between different bit rate ranges and different resolutions, and the second correspondence includes correspondences between different resolutions and different average single-frame sizes;

a ninth obtaining module 10039, configured to obtain an encoding bit rate that matches a network status;

a tenth obtaining module 100310, configured to determine, based on the first correspondence, that a resolution corresponding to the encoding bit rate is the target resolution;

an eleventh obtaining module 100311, configured to determine, based on the second correspondence, that an average single-frame size corresponding to the target resolution is a target average single-frame size;

a twelfth obtaining module 100312, configured to determine the target frame rate based on the target average single-frame size and the encoding bit rate; and a thirteenth obtaining module 100313, configured to obtain the video having the target frame rate and the target resolution.

The sending unit 1004 is configured to send the video having the target frame rate and the target resolution to the video receiving device.

Optionally, the sending unit 1004 is further configured to send request information to the video receiving device, where the request information is used to request the video receiving device to send the indication information.

Optionally, the receiving unit 1001 is further configured to receive, in a media negotiation process, the indication information sent by the video receiving device.

For description of beneficial effects of performing the video adaptation method by the video sending device in this embodiment, refer to the foregoing embodiment, and details are not described in this embodiment again.

Figure 11:
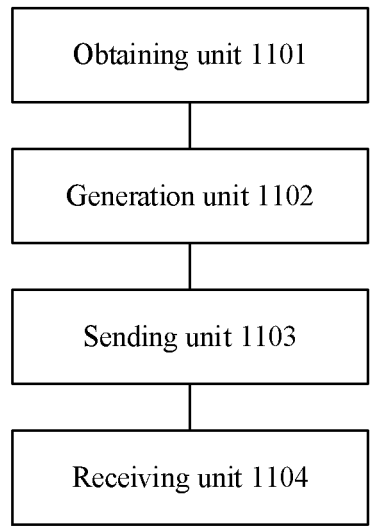
FIG. 11 is a schematic structural diagram of an embodiment of a video receiving device according to the present disclosure.

The following describes an example of a specific structure of a video receiving device provided in this application with reference to FIG. 11. The video receiving device is configured to perform a video adaptation method. For a specific execution process of the video adaptation method, refer to the foregoing embodiment.

An obtaining unit 1101 is configured to obtain an image super-resolution multiplier supported by the video receiving device.

A generation unit 1102 is configured to generate indication information, where the indication information is used to indicate the image super-resolution multiplier supported by the video receiving device.

A sending unit 1103 is configured to send the indication information to a video sending device, where the indication information is used to indicate an image super-resolution capability of the video receiving device.

A receiving unit 1104 is configured to: if the indication information indicates that the image super-resolution capability of the video receiving device is enabled, receive a video that is sent by the video sending device and that has a target frame rate and a target resolution, where the target frame rate and the target resolution correspond to the indication information.

Optionally, the receiving unit 1104 is further configured to receive request information sent by the video sending device.

The sending unit 1103 is further configured to send the indication information to the video sending device based on the request information.

Optionally, the sending unit 1103 is specifically configured to send the indication information to the video sending device in a media negotiation process.

For description of beneficial effects of performing the video adaptation method by the video receiving device in this embodiment, refer to the foregoing embodiment, and details are not described in this embodiment again.

From the perspective of physical hardware, the following describes a specific structure of an electronic device configured to implement the video adaptation method in the foregoing embodiment. The electronic device may be a video sending device, or may be a video receiving device.

Figure 12:
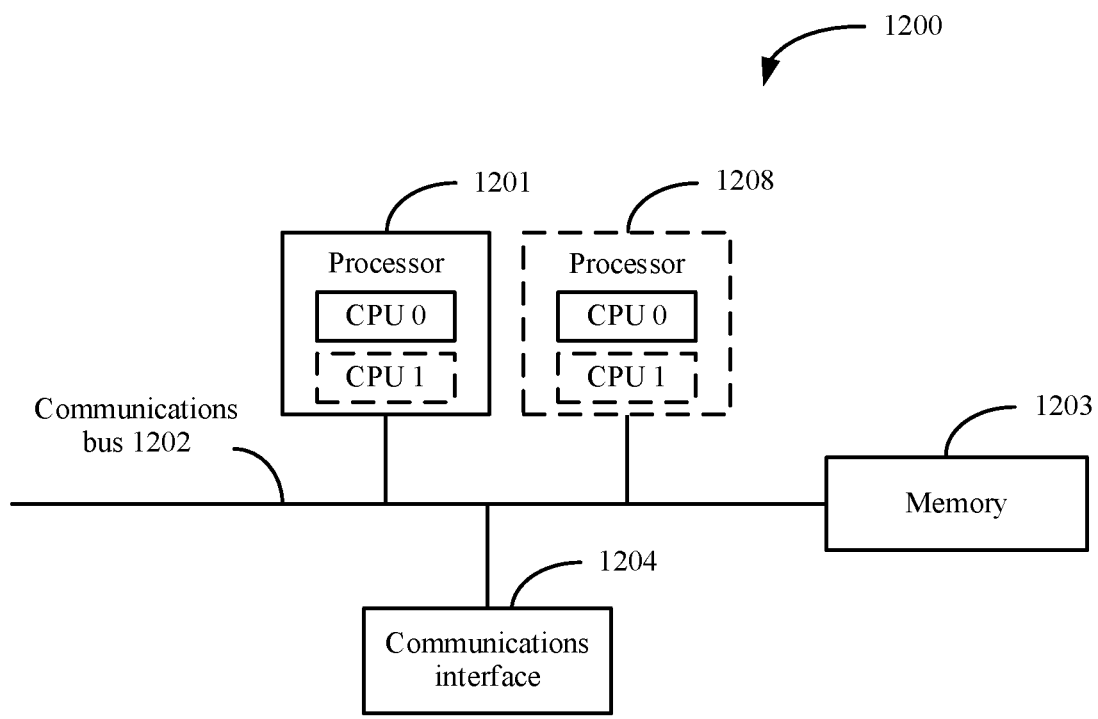
FIG. 12 is a schematic structural diagram of an embodiment of an electronic device according to the present disclosure.

As shown in FIG. 12, an electronic device 1200 includes at least one processor 1201, a communications bus 1202, and a memory 1203. The processor 1201 and the memory 1203 are connected through the communications bus.

The processor 1201 may be a general-purpose central processing unit (CPU), a microprocessor, an application-specific integrated circuit (ASIC), or one or more integrated circuits for controlling program execution of the solutions of the present disclosure.

The communications bus 1202 may include a path for transmitting information between the foregoing components.

Optionally, the electronic device 1200 may further include a communications interface 1204, configured to communicate with another device or communications network, such as the Ethernet, a radio access network (RAN), or a wireless local area network (WLAN).

The memory 1203 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer. This is not limited thereto. The memory may exist independently, and is connected to the processor through the bus. The memory may be alternatively integrated with the processor.

The memory 1203 is configured to store one or more programs for executing the solutions of the present disclosure. The one or more programs include instructions, and the instructions are executed under the control of the processor 1201 to implement the video adaptation methods in the foregoing embodiments.

During specific implementation, in an embodiment, the processor 1201 may include one or more CPUs, for example, a CPU 0 and a CPU 1 in FIG. 12.

During specific implementation, in an embodiment, the electronic device 1200 may include a plurality of processors, for example, the processor 1201 and a processor 1208 in FIG. 12. Each of the processors may be a single-core (single-CPU) processor or a multi-core (multi-CPU) processor. The processor herein may be one or more devices, circuits, and/or processing cores for processing data (such as computer program instructions).

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division. There may be another division manner during actual implementation. For example, a plurality of units or components may be combined or integrated into another system, or some features may be ignored or may be not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected according to actual requirements to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for indicating a computer device (which may be a personal computer, a server, a network device, or the like) to perform all or some of the steps of the methods in the embodiments of the present disclosure. The storage medium includes various media that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A video processing method, comprising:
    receiving, by a video sending device, indication information sent by a video receiving device, wherein the indication information indicates an image super-resolution capability of the video receiving device, wherein the indication information comprises an image super-resolution multiplier that has a positive correlation with a video definition enhancement capability of the video receiving device;
    determining, by the video sending device, that the indication information indicates the image super-resolution capability of the video receiving device is enabled, and obtaining a video having a target frame rate and a target resolution based on a network status and the indication information; and
    sending, from the video sending device, the video having the target frame rate and the target resolution to the video receiving device.

2. The method according to claim 1, wherein obtaining the video having the target frame rate and the target resolution that correspond to the indication information comprises:
    obtaining an encoding bit rate that matches a network status;
    obtaining an encoding frame rate corresponding to the encoding bit rate;
    obtaining a preset frame rate corresponding to the indication information;
    if the encoding frame rate is less than the preset frame rate, determining the target frame rate to be the preset frame rate;
    determining the target resolution based on the target frame rate; and
    obtaining the video having the target frame rate and the target resolution.

3. The method according to claim 2, wherein the method further comprises:
    configuring the preset frame rate based on the indication information, wherein a value of the preset frame rate corresponds to the image super-resolution multiplier supported by the video receiving device.

4. The method according to claim 2, wherein if the target frame rate is the preset frame rate, obtaining the video having the target frame rate and the target resolution that correspond to the indication information comprises:
    determining an average single-frame size based on the encoding bit rate and the target frame rate, wherein the average single-frame size is a quantity of bytes comprised in each video frame;
    determining that a resolution corresponding to the average single-frame size is the target resolution; and
    obtaining the video having the target frame rate and the target resolution.

5. The method according to claim 1, wherein obtaining the video having the target frame rate and the target resolution that correspond to the indication information comprises:
    obtaining a first correspondence and a second correspondence that correspond to the indication information, wherein the first correspondence comprises correspondences between different bit rate ranges and different resolutions, and the second correspondence comprises correspondences between different resolutions and different average single-frame sizes;
    obtaining an encoding bit rate that matches a network status;
    determining, based on the first correspondence, that a resolution corresponding to the encoding bit rate is the target resolution;
    determining, based on the second correspondence, that an average single-frame size corresponding to the target resolution is a target average single-frame size;
    determining the target frame rate based on the target average single-frame size and the encoding bit rate; and
    obtaining the video having the target frame rate and the target resolution.

6. The method according to claim 1, wherein if the indication information is further used to indicate the image super-resolution multiplier supported by the video receiving device, the method further comprises:

if the multiplier indicated by the indication information is greater than 1, performing the step of obtaining the video having the target frame rate and the target resolution that correspond to the indication information.

7. The method according to claim 1, wherein receiving indication information sent by the video receiving device comprises:
receiving, in a media negotiation process, the indication information sent by the video receiving device.

8. The method according to claim 1, wherein obtaining the video having the target frame rate and the target resolution that correspond to the indication information comprises:
obtaining an encoding bit rate that matches a network status;
obtaining an encoding frame rate corresponding to the encoding bit rate;
obtaining a preset frame rate corresponding to the indication information;
if the encoding frame rate is greater than or equal to the preset frame rate, determine that the target frame rate is the encoding frame rate;
determining the target resolution based on the target frame rate; and
obtaining the video having the target frame rate and the target resolution.

9. A video processing method, comprising:
sending, by a video receiving device, indication information to a video sending device, wherein the indication information indicates an image super-resolution capability of the video receiving device, wherein the indication information comprises an image super-resolution multiplier that has a positive correlation with a video definition enhancement capability of the video receiving device; and
receiving a video that is sent by the video sending device and that has a target frame rate and a target resolution, wherein the target frame rate and the target resolution are based on a network status and the indication information.

10. The method according to claim 9, wherein before sending indication information to the video sending device, the method further comprises:
obtaining the image super-resolution multiplier supported by the video receiving device; and
generating the indication information, wherein the indication information is used to indicate the image super-resolution multiplier supported by the video receiving device.

11. The method according to claim 9, wherein sending indication information to the video sending device comprises:
sending the indication information to the video sending device in a media negotiation process.

12. An electronic device, comprising:
one or more processors, a memory, a communications bus, and one or more programs, wherein the processor and the memory are connected through the communications bus; and
the one or more programs are stored in the memory, the one or more programs comprise instructions, and when the instructions are executed by the electronic device, the electronic device performs the following operations:
receive indication information sent by a video receiving device, wherein the indication information indicates an image super-resolution capability of the video receiving device, wherein the indication information comprises an image super-resolution multiplier that has a positive correlation with a video definition enhancement capability of the video receiving device;
if the indication information indicates that the image super-resolution capability of the video receiving device is enabled, obtain a video having a target frame rate and a target resolution that correspond to the indication information; and
send, from the video sending device, the video having the target frame rate and the target resolution to the video receiving device.

13. The electronic device according to claim 12, wherein obtaining the video having the target frame rate and the target resolution that correspond to the indication information comprises:
obtaining an encoding bit rate that matches a network status;
obtaining an encoding frame rate corresponding to the encoding bit rate;
obtaining a preset frame rate corresponding to the indication information;
if the encoding frame rate is less than the preset frame rate, determining that the target frame rate is the preset frame rate;
determining the target resolution based on the target frame rate; and
obtaining the video having the target frame rate and the target resolution.

14. The electronic device according to claim 13, wherein the electronic device further performs:
configure the preset frame rate based on the indication information, wherein a value of the preset frame rate corresponds to the image super-resolution multiplier supported by the video receiving device.

15. The electronic device according to claim 13, wherein if the target frame rate is the preset frame rate, obtaining the video having the target frame rate and the target resolution that correspond to the indication information comprises:
determining an average single-frame size based on the encoding bit rate and the target frame rate, wherein the average single-frame size is a quantity of bytes comprised in each video frame;
determining that a resolution corresponding to the average single-frame size is the target resolution; and
obtaining the video having the target frame rate and the target resolution.

16. The electronic device according to claim 12, wherein obtaining the video having the target frame rate and the target resolution that correspond to the indication information comprises:
obtaining a first correspondence and a second correspondence that correspond to the indication information, wherein the first correspondence comprises correspondences between different bit rate ranges and different resolutions, and the second correspondence comprises correspondences between different resolutions and different average single-frame sizes;
obtaining an encoding bit rate that matches a network status;
determining, based on the first correspondence, that a resolution corresponding to the encoding bit rate is the target resolution;
determining, based on the second correspondence, that an average single-frame size corresponding to the target resolution is a target average single-frame size;
determining the target frame rate based on the target average single-frame size and the encoding bit rate; and obtaining the video having the target frame rate and the target resolution.

17. The electronic device according to claim 12, wherein if the indication information is further used to indicate the image super-resolution multiplier supported by the video receiving device, the electronic device further performs:
   if the multiplier indicated by the indication information is greater than 1, obtaining a video having a target frame rate and a target resolution that correspond to the indication information.

18. The electronic device according to claim 12, wherein receiving indication information sent by the video receiving device comprises:
   receiving, in a media negotiation process, the indication information sent by the video receiving device.

19. The electronic device according to claim 12, wherein obtaining the video having the target frame rate and the target resolution that correspond to the indication information comprises:
   obtaining an encoding bit rate that matches a network status;
   obtaining an encoding frame rate corresponding to the encoding bit rate;
   obtaining a preset frame rate corresponding to the indication information;
   if the encoding frame rate is greater than or equal to the preset frame rate, determine that the target frame rate is the encoding frame rate;
   determining the target resolution based on the target frame rate; and
   obtaining the video having the target frame rate and the target resolution.

20. A video receiving device, comprising:
   one or more processors, a memory, a communications bus, and one or more programs, wherein the processor and the memory are connected through the communications bus; and
   the one or more programs are stored in the memory, the one or more programs comprise instructions, and when the instructions are executed by the electronic device, the electronic device performs the following operations:
   sending, by the video receiving device, indication information to a video sending device, wherein the indication information indicates an image super-resolution capability of the video receiving device, wherein the indication information comprises an image super-resolution multiplier that has a positive correlation with a video definition enhancement capability of the video receiving device; and
   receiving a video that is sent by the video sending device and that has a target frame rate and a target resolution, wherein the target frame rate and the target resolution are based on a network status and the indication information.

21. The video receiving device according to claim 20, wherein before sending indication information to the video sending device, the method further comprises:
   obtaining the image super-resolution multiplier supported by the video receiving device; and
   generating the indication information, wherein the indication information is used to indicate the image super-resolution multiplier supported by the video receiving device.

22. The video receiving device according to claim 20, wherein sending indication information to the video sending device comprises:
   sending the indication information to the video sending device in a media negotiation process.

* * * * *